(12) United States Patent
Ougarov et al.

(10) Patent No.: US 8,700,671 B2
(45) Date of Patent: Apr. 15, 2014

(54) SYSTEM AND METHODS FOR DYNAMIC GENERATION OF POINT / TAG CONFIGURATIONS

(75) Inventors: Andrei V. Ougarov, Rancho Santa Margarita, CA (US); Paul Daniel Carmichael, Laguna Niguel, CA (US); Jesse G. DeMesa, Lake Forest, CA (US)

(73) Assignee: Siemens Aktiengesellschaft, Munich (DE)

( * ) Notice: Subject to any disclaimer, the term of this patent is extended or adjusted under 35 U.S.C. 154(b) by 387 days.

(21) Appl. No.: 11/204,647

(22) Filed: Aug. 15, 2005

(65) Prior Publication Data

US 2006/0067334 A1    Mar. 30, 2006

Related U.S. Application Data

(60) Provisional application No. 60/603,018, filed on Aug. 18, 2004.

(51) Int. Cl.
G06F 7/00 (2006.01)
G06F 17/30 (2006.01)

(52) U.S. Cl.
USPC .......................... 707/796; 707/803; 709/248

(58) Field of Classification Search
None
See application file for complete search history.

(56) References Cited

U.S. PATENT DOCUMENTS

| | | | |
|---|---|---|---|
| 5,412,774 A | 5/1995 | Agrawal et al. | |
| 5,414,809 A | 5/1995 | Hogan et al. | |
| 5,487,141 A | 1/1996 | Cain et al. | |
| 5,519,866 A | 5/1996 | Lawrence et al. | |
| 5,566,330 A | 10/1996 | Sheffield | |
| 5,632,022 A | 5/1997 | Warren et al. | |
| 5,760,770 A | 6/1998 | Bliss et al. | |
| 5,764,226 A | 6/1998 | Consolatti et al. | |
| 5,787,283 A | 7/1998 | Chin et al. | |
| 5,825,361 A | 10/1998 | Rubin et al. | |
| 5,864,862 A | 1/1999 | Kriens et al. | |
| 5,907,704 A | 5/1999 | Gudmundson et al. | |
| 5,917,498 A | 6/1999 | Korenshtein | |
| 5,958,012 A | 9/1999 | Battat et al. | |
| 5,970,476 A | 10/1999 | Fahey | |
| 5,980,096 A | 11/1999 | Thalhammer-Reyero | |
| 5,982,362 A * | 11/1999 | Crater et al. | 715/719 |
| 5,991,534 A | 11/1999 | Hamilton et al. | |
| 5,999,940 A | 12/1999 | Ranger | |
| 6,002,853 A | 12/1999 | de Hond | |
| 6,003,036 A | 12/1999 | Martin | |
| 6,014,138 A | 1/2000 | Cain et al. | |
| 6,029,181 A | 2/2000 | Milakovich et al. | |
| 6,122,664 A | 9/2000 | Boukobza et al. | |
| 6,178,362 B1 | 1/2001 | Woolard et al. | |
| 6,198,480 B1 * | 3/2001 | Cotugno et al. | 715/866 |

(Continued)

FOREIGN PATENT DOCUMENTS

| | | |
|---|---|---|
| WO | 03/062934 A1 | 7/2003 |
| WO | 2006/018738 A1 | 2/2006 |
| WO | 2006/039760 A1 | 4/2006 |

*Primary Examiner* — Daniel Kuddus

(74) *Attorney, Agent, or Firm* — Buckley, Maschoff & Talwalkar LLC

(57) ABSTRACT

A system and methods for implementing tag synchronization routines providing automated tag definition and management functionalities. Tag configurations are highly configurable to obtain information from multiple back end systems and able to support data access from many different sources. Additionally, the tag configurations provide convenient mechanisms by which to control data access and preserve data integrity in an automated manner.

36 Claims, 11 Drawing Sheets

(56) References Cited

U.S. PATENT DOCUMENTS

| | | | |
|---|---|---|---|
| 6,223,182 B1* | 4/2001 | Agarwal et al. | 1/1 |
| 6,246,410 B1 | 6/2001 | Bergeron et al. | |
| 6,247,020 B1 | 6/2001 | Minard | |
| 6,262,729 B1 | 7/2001 | Marcos et al. | |
| 6,263,339 B1 | 7/2001 | Hirsch | |
| 6,282,697 B1 | 8/2001 | Fables et al. | |
| 6,301,584 B1* | 10/2001 | Ranger | 1/1 |
| 6,307,546 B1 | 10/2001 | Wickham et al. | |
| 6,336,138 B1 | 1/2002 | Caswell et al. | |
| 6,381,605 B1* | 4/2002 | Kothuri et al. | 707/100 |
| 6,429,882 B1 | 8/2002 | Abdelnur et al. | |
| 6,430,565 B1 | 8/2002 | Berger et al. | |
| 6,463,352 B1 | 10/2002 | Tadokoro et al. | |
| 6,477,434 B1 | 11/2002 | Wewalaarachchi et al. | |
| 6,480,836 B1 | 11/2002 | Colby et al. | |
| 6,490,719 B1 | 12/2002 | Thomas | |
| 6,505,205 B1* | 1/2003 | Kothuri et al. | 1/1 |
| 6,505,246 B1 | 1/2003 | Land et al. | |
| 6,505,247 B1 | 1/2003 | Steger et al. | |
| 6,505,605 B2* | 1/2003 | Yamada et al. | 123/406.14 |
| 6,543,046 B1 | 4/2003 | Lunt | |
| 6,609,123 B1 | 8/2003 | Cazemier et al. | |
| 6,643,555 B1 | 11/2003 | Eller et al. | |
| 6,643,691 B2 | 11/2003 | Austin | |
| 6,687,761 B1 | 2/2004 | Collins et al. | |
| 6,700,590 B1 | 3/2004 | DeMesa et al. | |
| 6,704,743 B1 | 3/2004 | Martin | |
| 6,751,657 B1 | 6/2004 | Zothner | |
| 6,842,774 B1 | 1/2005 | Piccioni | |
| 6,919,904 B1* | 7/2005 | Kilgariff | 345/582 |
| 6,952,705 B2 | 10/2005 | Knoblock et al. | |
| 6,996,566 B1* | 2/2006 | George et al. | 1/1 |
| 7,036,059 B1* | 4/2006 | Carmichael et al. | 714/725 |
| 7,069,514 B2 | 6/2006 | DeMesa et al. | |
| 7,133,865 B1 | 11/2006 | Petersen et al. | |
| 7,275,024 B2 | 9/2007 | Yeh et al. | |
| 7,478,128 B2 | 1/2009 | Helmstetter et al. | |
| 7,523,111 B2* | 4/2009 | Walmsley | 1/1 |
| 7,689,579 B2* | 3/2010 | DeMesa et al. | 707/999.102 |
| 7,698,292 B2 | 4/2010 | DeMesa et al. | |
| 7,814,123 B2 | 10/2010 | Nguyen et al. | |
| 7,840,607 B2 | 11/2010 | Henigman et al. | |
| 2001/0001851 A1 | 5/2001 | Piety et al. | |
| 2001/0040591 A1 | 11/2001 | Abbott et al. | |
| 2002/0083041 A1* | 6/2002 | Achlioptas et al. | 707/1 |
| 2002/0099499 A1* | 7/2002 | Takayama et al. | 701/200 |
| 2002/0169867 A1 | 11/2002 | Mann et al. | |
| 2002/0184610 A1 | 12/2002 | Chong et al. | |
| 2002/0186248 A1 | 12/2002 | Ramanathan et al. | |
| 2002/0198679 A1 | 12/2002 | Victor et al. | |
| 2002/0198978 A1 | 12/2002 | Watkins | |
| 2003/0020703 A1 | 1/2003 | Holub | |
| 2003/0055832 A1 | 3/2003 | Roccaforte | |
| 2003/0058277 A1 | 3/2003 | Bowman-Amuah | |
| 2003/0074360 A1* | 4/2003 | Chen et al. | 707/100 |
| 2003/0105857 A1 | 6/2003 | Kamen et al. | |
| 2003/0120627 A1 | 6/2003 | Emery et al. | |
| 2003/0139958 A1* | 7/2003 | Thengvall et al. | 705/8 |
| 2003/0139968 A1* | 7/2003 | Ebert | 705/22 |
| 2003/0140007 A1* | 7/2003 | Kramer et al. | 705/40 |
| 2003/0163329 A1 | 8/2003 | Bolene | |
| 2004/0036716 A1 | 2/2004 | Jordahl | |
| 2004/0059436 A1 | 3/2004 | Anderson et al. | |
| 2004/0117393 A1* | 6/2004 | DeMesa et al. | 707/100 |
| 2004/0162834 A1 | 8/2004 | Aono et al. | |
| 2004/0215626 A1 | 10/2004 | Colossi et al. | |
| 2004/0220972 A1 | 11/2004 | Bhattacharjee et al. | |
| 2004/0243281 A1 | 12/2004 | Fujita et al. | |
| 2005/0021622 A1 | 1/2005 | Cullen | |
| 2005/0044097 A1 | 2/2005 | Singson et al. | |
| 2005/0065910 A1 | 3/2005 | Welton et al. | |
| 2005/0071749 A1 | 3/2005 | Goerke et al. | |
| 2005/0104899 A1* | 5/2005 | Swartz et al. | 345/629 |
| 2005/0143969 A1 | 6/2005 | DeMesa et al. | |
| 2005/0144154 A1 | 6/2005 | DeMesa et al. | |
| 2005/0172306 A1 | 8/2005 | Agarwal et al. | |
| 2005/0182709 A1 | 8/2005 | Belcsak et al. | |
| 2005/0216555 A1 | 9/2005 | English et al. | |
| 2005/0228861 A1 | 10/2005 | Nagayama et al. | |
| 2005/0234920 A1 | 10/2005 | Rhodes | |
| 2005/0246627 A1 | 11/2005 | Sayed | |
| 2005/0251571 A1 | 11/2005 | Karstens | |
| 2005/0265162 A1 | 12/2005 | Tsubakihara | |
| 2006/0031250 A1 | 2/2006 | Henigman et al. | |
| 2006/0067334 A1 | 3/2006 | Ougarov et al. | |
| 2006/0074505 A1 | 4/2006 | Kline, Jr. | |
| 2006/0116994 A1 | 6/2006 | Jonker et al. | |
| 2006/0123019 A1 | 6/2006 | Nguyen et al. | |
| 2006/0136583 A1 | 6/2006 | Helmstetter et al. | |
| 2006/0161597 A1 | 7/2006 | Ougarov et al. | |
| 2006/0187713 A1 | 8/2006 | Weetman | |
| 2006/0200741 A1 | 9/2006 | DeMesa et al. | |
| 2006/0218116 A1 | 9/2006 | O'Hearn et al. | |
| 2006/0218131 A1 | 9/2006 | Brenes et al. | |
| 2006/0294199 A1 | 12/2006 | Bertholf | |
| 2007/0038889 A1 | 2/2007 | Wiggins et al. | |
| 2007/0118599 A1 | 5/2007 | Castanho et al. | |
| 2007/0124209 A1 | 5/2007 | Walker et al. | |
| 2007/0208574 A1 | 9/2007 | Zheng et al. | |
| 2007/0239741 A1 | 10/2007 | Jordahl | |
| 2008/0103786 A1 | 5/2008 | Zhang et al. | |
| 2010/0223296 A1 | 9/2010 | Angus et al. | |

* cited by examiner

600
                                                    /

610 ——— Component Name: Tag
        Member Name         Member Type        Attribute
      ┌ High Limit          Real               -
      │ Low Limit           Real               -
  620 ┤ Value  ~622         Real               value
      │ TagName ~624        String             key
      │ Units~626           String             units
      └ Config ~628         String             config 630 ——— Component Name: Pump
        Member Name         Member Type        Attribute
        Tag                 Tag 640 ——— Component Name: Conveyor
        Member Name         Member Type        Attribute
        Tag                 Tag 650 ——— Component Name: Area
        Member Name         Member Type        Attribute
  660 ┌ intakePump          Pump               -
      └ outletPump          Pump               -
  670 ┌ conveyor1           Conveyor           -
      └ conveyor2           Conveyor           -

680 ——— Component Name: Plant
        Member Name         Member Type        Attribute
        Area1               Area               -

FIGURE 6A

SYSTEM AND METHODS FOR DYNAMIC GENERATION OF POINT / TAG CONFIGURATIONS

CROSS-REFERENCE TO RELATED APPLICATIONS

This application claims the benefit of priority from U.S. Provisional Application No. 60/603,018 filed on Aug. 18, 2004 entitled "DYNAMIC AND AUTOMATED METHOD TO GENERATE POINT/TAG CONFIGURATIONS".

FIELD

This application generally relates to information management strategies and more particularly to a system and methods for automated management of tag configurations and data acquisition from back-end systems.

BACKGROUND

Information retrieval and management within a business or organizational enterprise typically presents numerous technical issues associated with data integration and interpretation, especially when the data originates from multiple sources. For example, difficulties often arise when aggregating data from real-time informational sources and associating this data with other desired information. For real-time systems with dynamically changing data accessibility, bandwidth, and latency concerns limit the flexibility and scalability of these systems as a whole. Furthermore, complex systems having many different informational sources become increasingly difficult to configure, monitor, and manage efficiently without suitable automation mechanisms to facilitate these operations.

Conventional systems designed for operation in the aforementioned context are frequently tag-based. As an example, a tag-based manufacturing plant may include monitoring and control functionalities associated with various operational parameters for components and sub-components of the plant. Operation of the plant necessitates processing large amounts of real-time and/or near real-time data. This data, referred to as point data, originates from various sources configured to provide substantially "raw" or "native" information at selected intervals. Taken alone, this data provides little or no context for its interpretation and may require additional information to be associated with it to permit meaningful processing and analysis. It may also be desirable to distribute point data to other processing components requiring some degree of context be ascribed to the point data.

Modern industrial automation systems, supervisory control and data acquisition (SCADA) systems, general data acquisition systems and plant data historians represent exemplary systems that manage and process real-time and/or near real-time information in the form of point data. In such systems, a "tag" represents a structural data element comprising point data associated with various components of the system. The point data of selected tags are desirably made accessible to other components, systems, applications and/or users in various combinations. In general, point data is subject to frequent change and may be monitored and reported through various operations and functions. In industrial automation and control systems, decision support and reporting capabilities may also be provided using tag-associated point data monitored over very short timeframes ranging in the sub-second to sub-minute range.

Non-point data relates to a broad category of information that contextualizes point data in various ways. Non-point data may include descriptive and/or attribute information characterizing the point data, as well as, other information such as limits, ranges, etc. In conventional systems, integral and flexible manipulation of tag-based point data and non-point data is restricted due to their inherent differences and properties. For example, conventional systems typically provide only limited integration and relational functionality for tag-based data and non-tag-based data. Such integration is generally further limited by tedious manual configuration operations which require significant effort and time to deploy.

Developing efficient and flexible data acquisition strategies for information retrieval and management tasks associated with point data and non-point data is important for numerous reasons. Of particular importance is the need to insure accuracy and timeliness in the data without imparting undue computational or transmission load within the system. Furthermore, there is a need for providing increasingly adaptive procedures, including the ability to automate configuration and management of tags and their associated point data sources, to reduce or eliminate developmental and deployment inefficiencies found in conventional systems.

BRIEF DESCRIPTION OF THE DRAWINGS

These and other aspects, advantages, and novel features of the various embodiments of the invention are set forth in the following detailed description and upon reference to the accompanying drawings. In the drawings, same elements have the same reference numerals in which:

FIG. 6A illustrates an exemplary tag component definition having a plurality of tag component members.

DETAILED DESCRIPTION

Figure 1:
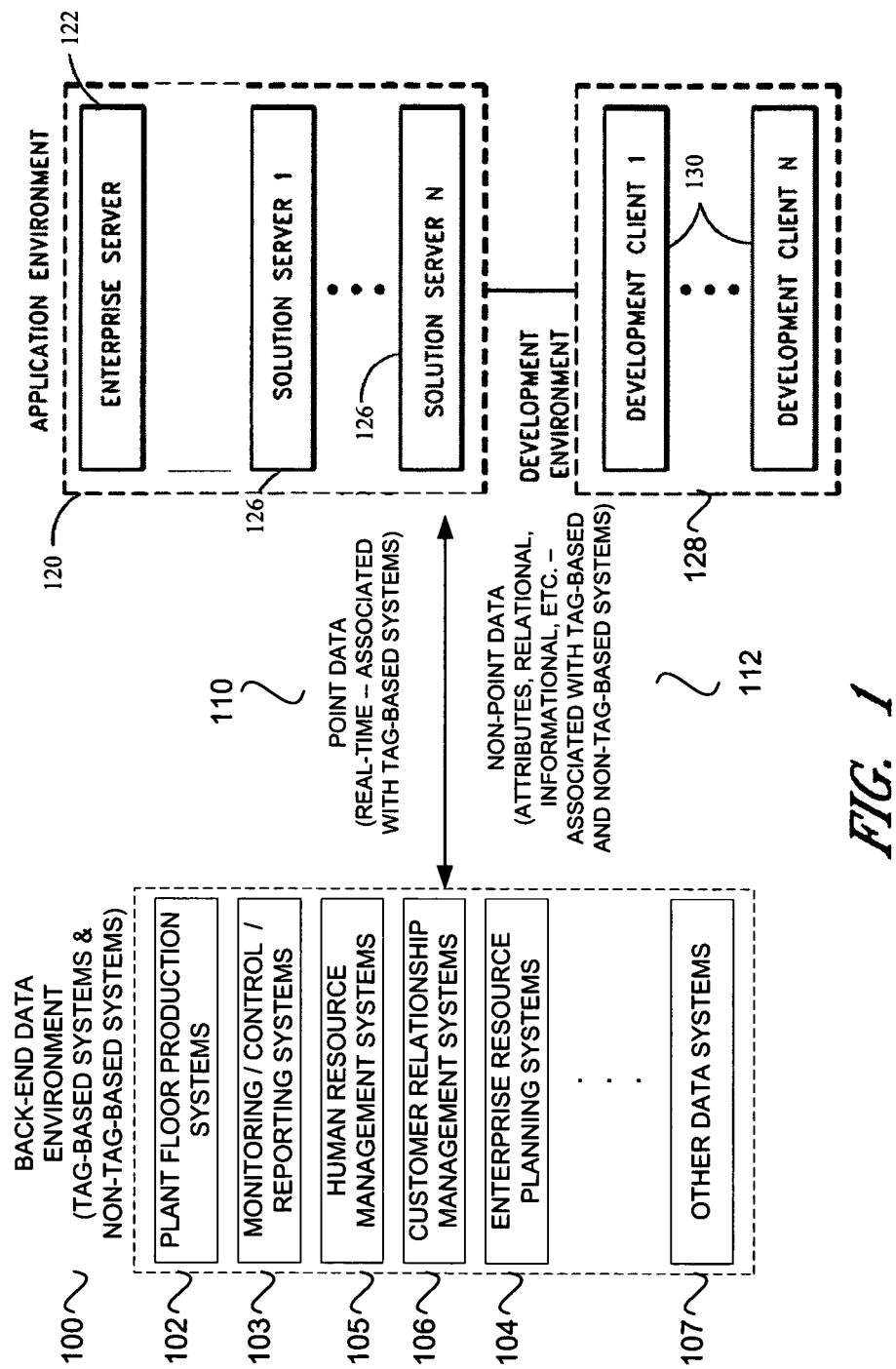
FIG. 1 illustrates a point/non-point data acquisition system according to various embodiments of the invention.

The following description provides details of various embodiments of a system and methods for generating flexible tag, point data, and non-point data associations. Furthermore, the present teachings may be used to implement routines for automated and semi-automated tag configuration. In one aspect, such routines may be used to improve synchronization of tag-based data, non-tag-based data, point data, non-point data and various combinations thereof.

Tag synchronization as detailed below may be adapted for use in the collection, management, and organization of point data and non-point data from a variety of different data sources. As previously described, tag-based data management applications may be implemented in industrial automation systems, supervisory control and data acquisition (SCADA) systems, general data acquisition systems, plant data historians, and other systems. Commonly assigned U.S. patent application Ser. No. 10/993,712 filed Nov. 19, 2004 entitled "TAG MANAGEMENT WITHIN A DECISION, SUPPORT, AND REPORTING ENVIRONMENT" provides details of an exemplary model and environment for tag-based data management. The tag/point data synchronization and association features described herein may be applied to various aspects of this model, as well as, adapted for use in other contexts.

In various embodiments, the invention provides improved mechanisms for retrieving, manipulating, organizing, and analyzing information in systems where point data and non-point data coexist. A class-based representational model supporting tags is disclosed, however, it will be appreciated that the methods described herein are not limited for use exclusively with this model. According to certain embodiments, data management and synchronization functionalities utilize data structures that store and manipulate both point data and non-point data in a cohesive manner. Numerous benefits may be realized from the disclosed methods of integrated data management and synchronization including improved system performance and reduced developmental overhead.

As used herein, point data may be characterized as current, real-time, or value data often associated with systems, instruments, components, or portions thereof. Point data is utilized in various manufacturing, industrial, and commercial contexts where it is generated, measured, and/or sampled from one or more point data sources of interest. For example, a data acquisition system for a particular instrument having at least one motor may continuously or periodically acquire data reflecting the motor's operating speed and/or operating temperature as point data from a point data source associated with the motor in certain instances, the point data may be a simple numerical or string value. Point data may further be associated with monitoring, control, and reporting functions of various instruments, components, and applications to provide information relating to the operation of a selected system. This information may also be made available for collection and review by various data acquisition and control systems.

Point data is often acquired in a raw or unstructured form wherein the point data reflects a numerical or string value without supporting details, description, and/or attributes. As previously described, certain types of point data may be associated with real-time or near real-time information (e.g. current temperature, pressure, speed, voltage, current, etc.) that may be desirably sampled, updated or refreshed relatively frequently. The exact frequency of these operations is typically dependent on the characteristics of the point data itself and may be different across the multiple point data sources incorporated into a particular system. Providing mechanisms to allow for customization of the acquisition strategies for various classes of point data becomes increasingly significant as the size or complexity of the system grows. In various embodiments of the invention, it is desirable to automate at least a portion of these processes to reduce or eliminate dependency on manual configuration and maintenance. In particular, it is desirable to provide automated and dynamic methods that allow coherent structuring of information from a plurality of point data and non-point data sources.

As will be appreciated by those of skill in the art, point data interpretation is problematic without providing suitable context to the information. To give point data context it may therefore be desirable to associate it with selected non-point information. Non-point data may take many forms, including but not limited to, attribute information, parameters, limits and other descriptive information. As used herein, the terms point data and non-point data encompass various categories of information which are not necessarily constrained to the examples described herein. As such, the various embodiments of the invention may be applied to a variety of different contexts embodied in the combination and use of point data and non-point data.

Other useful non-point data may include information such as maintenance work orders (relational data or API (Application Programming Interface) structure data from maintenance systems), equipment documentation (unstructured data usually contained within operating system files and documents), and information such as URL (Uniform Resource Locator) links to supplier web sites. These types of non-point data may be associated with non-tag based information contained, for example, within Oracl® or SAP® databases/environments. Non-point data therefore represents a broad class of information that may be associated with point data providing a contextual and informational basis.

Various embodiments of the invention provide mechanisms to integrate tag-based data (including point data and non-point data) with non-tag-based data. Certain features of the invention overcome conventional limitations of relating tag-based data and non-tag-based data providing improved integration, management and utilization. One exemplary architecture in which tag-based and non-tag-based data (as well as point data and non-point data) may be collectively utilized is the XHQ software platform (developed and distributed by IndX Software Corporation, Aliso Viejo, Calif.). Additional details regarding the configuration and use of this system may be found in various user manuals and technical publications describing the applications and architecture. In various embodiments, such an application may be configured to provide a data aggregation and modeling framework and tools for retrieving, manipulating, analyzing, and associating tag-based and non-tag-based data (as well as point data and non-point data) from one or more sources.

Point data and non-point data may be collectively referred to as operations data. In various embodiments, operations data reflects data that is collected, evaluated and/or presented through the platform or associated applications software. As will be described in greater detail hereinbelow, the invention may operate to provide this information to a user in various types and combinations reflecting desired information obtained or associated with substantially any back end resource.

The various embodiments of the invention can be employed in a wide variety of industries and operational facilities. Any industrial process with differing types of operations data may be supplying data to systems utilizing the invention. For instance, exemplary industries involved may comprise natural resource refinement and procurement facilities, oil and gas procurement, oil and gas refinement, chemical/petrochemical synthesis and refinement, water treatment, power generation, power transmission, food and beverage processing, raw materials processing (such as pulp, lumber, metals, minerals) agricultural processing and materials processing facilities (e.g. steel mills and foundries). The aforementioned industries are well suited to utilize platforms and software built upon concepts embodied in the invention. Additionally, facilities involved in finished goods manufacturing and production such as product assembly lines may utilize one or more embodiments of invention or systems with such features.

Various assets, equipment, machinery, flows, etc. may be associated with the industries and operational facilities that produce operations data which may be continuous or discrete and may involve operations data that is presented in batches. Examples include pumps, motors, tanks, pipelines, mills, lathes, mixers, assembly lines, and so on. Operations data may further include data from machinery, assets, process historians, maintenance systems, enterprise resource planning systems and the like. Examples of such data include pressure, temperature, capacities, volumes, rates of flow, production totals, inventories, performance indicators and the like.

One feature of present invention is the ability to provide enhanced accessibility and presentability to operations data by bringing tag-based and non-tag-based data together in a dynamic and automated manner. Additionally, in various embodiments, the present invention allows for unique configuration of operations data associated with selected tags using a rule-based process. In still further embodiments, the disclosed methods of tag synchronization reduce or eliminate the need to model or create instances (e.g. object instances) of tags. Consequently, tags and their related operational data (e.g. point data and non-point data) may be made accessible for use in complex calculations in a simplified and straightforward manner.

Utilization of the various embodiments of the invention further provides a mechanism by which to manage information obtained from one or more back-end data systems. Back-end data systems may include various conventional systems for receiving and processing operational data. In certain instances a back-end data system has only limited capabilities to provide, receive, or process point data whereas in other instances the back-end data system may process both point and non-point data. In the context of a tag-based architecture, various back-end data systems may be used to collect point data and perform operations in which non-point data is associated with point data. Each so called "tag" may therefore represent a data structure comprising a selected quanta of information associated with a particular point data informational source and may also comprise certain non-point data. The various embodiments of the invention provide a mechanism for extending tag-based data management capabilities allowing for improved integration of point data and non-point data. Such features are especially useful across enterprise-level environments wherein large amounts of point data and non-point data are to be collectively managed.

In the context of informational aggregation, tag presentation, and data warehousing the various embodiments of the invention may be adapted to improve accessibility and usability of operational data through processes that synchronize point data and non-point data allowing joining or merging this data. In one aspect, merged point and non-point data occurs in an object-oriented system or class-like manner providing improved flexibility in the handling, processing and display capabilities. Additionally, mechanisms for securing tag-based information are provided including the ability to implement flexible accessibility grants and view restrictions.

In conventional systems, configuration of a data acquisition to acquire each tag's current value (e.g. point data associated information) generally requires a unique configuration for each tag and possibly each tag's attributes (e.g. non-point data). Considering that it is not uncommon for complex industrial automation applications to contain upwards of 100,000 tags, it will be appreciated that the individualized configuration and management of tags in the aforementioned manner can be very time consuming, inefficient, and error prone. Furthermore, conventional mechanisms for control, monitoring, or archiving of tag-based information tend to become even less useful when attempting to aggregate such information across multiple systems such as in the context of other plant production systems and applications.

The various embodiments of the invention provide mechanisms by which to effectively address the aforementioned limitations using a novel approach that combines acquiring non-point data (e.g. attributes and other information that does not change frequently) with generally more frequently changing point data (e.g. a tag's real-time or current value). Furthermore, a rule-based acquisition approach may be implemented to reduce or eliminate individual tag configuration thus providing for more rapid development of data organization and visualization tools.

The present invention extends synchronization functions associated with point and non-point data processing. Additionally, the invention provides improved scalability allowing for convenient management and improved performance when dealing with large numbers of tags (e.g. thousands of tags or more). These features are distinguished from those of conventional systems wherein tags require manual definition and configuration through laborious modeling processes. The present invention overcomes this limitation implementing a unique approach to tag management capable of reducing the number of manual operations required and providing a more automated system.

The present invention further insures that information contained within tags is synchronized and refreshed in a timely manner. In certain embodiments, tag synchronization capabilities provide automated mechanisms to define and update tags to maintain consistency within a tag collection. Generally, the process of synchronization may allow access of back-end data sources to be conducted in a semi or fully automated manner. Additionally, the disclosed system is highly scalable providing synchronization capabilities for both small systems having only a few tags and very large systems having several hundred thousands of tags or more. The systems and methods for tag synchronization additionally support a variety of different data types and tag configurations allowing data from multiple back-end data sources to be managed individually or collectively.

In various embodiments the invention comprises a method for the aggregation of operational data acquired from at least one back-end resource. The method further comprises providing a first data structure for storing operational data comprising non-point data acquired according to a first acquisition strategy from the at least one back-end resource; providing a second data structure for storing operational data comprising point data acquired according to a second acquisition strategy from the at least one back-end resource; and invoking a synchronization process that assesses current configurations for the first and second data structures and modifies that current configurations in a manner suitable to achieve desired configurations for the first and second data structures, the synchronization process further providing modifications to the first and second acquisition strategies, as necessary, to store the point data and non-point data within the first and second data structures according to the desired configurations.

In further embodiments, the invention comprises a method for aggregation of operational data acquired from at least one back-end resource. This method further comprises the steps of: providing a first data structure with current configuration for storing operational data comprising non-point data acquired according to a first acquisition strategy from the at least one back-end resource; providing a second data structure with current configuration for storing operational data comprising point data acquired according to a second acquisition strategy from the at least one back-end resource; assessing the current configuration of the first data structure and providing modifications to achieve a desired configuration for the first data structure; assessing the current configuration of the second data structure and providing modifications to achieve a desired configuration for the second data structure; and modifying the first and second acquisition strategies, as necessary, to store the point data and non-point data within the first and second data structures according to the desired configurations.

In still other embodiments, the invention comprises a computer-based system for providing configurable associations of tag-based information. This system further comprises: a generator module that provides a data solution comprising at least one connector for accessing operational data comprising point data and non-point data associated with at least one at least one back-end resource; the data solution further comprising at least one acquisition strategy that specifies the manner of point data and non-point data access; a synchronization module that evaluates the at least one connector and the at least one acquisition strategy of the data solution and automatically conforms them to a desired configuration reflecting selected point data and non-point data associations, and a runtime module that recognizes the data solution and effectuates acquisition of the point data and non-point data from the at least one back-end resource according to the desired configuration.

In further embodiments, the invention comprises a computer-readable medium having stored thereon instructions which, when executed by a processor, cause the processor to: store non-point data acquired according to a first acquisition strategy from the at least one back-end resource in a first data structure; store point data acquired according to a second acquisition strategy from the at least one back-end resource in a second data structure; and invoke a synchronization process that assesses current configurations for the first and second data structures and modifies that current configurations in a manner suitable to achieve desired configurations for the first and second data structures, the synchronization process further providing modifications to the first and second acquisition strategies, as necessary, to store the point data and non-point data within the first and second data structures according to the desired configurations.

FIG. 1 represents a high level diagram illustrating components of an exemplary data acquisition and management system according to at least one embodiment of the invention. In various embodiments, such a system may be used in connection with monitoring, control, and reporting operations associated with a continuous process or batch processing facility. Such facilities include by way of example, chemical/petrochemical refineries (e.g. oil, gas, etc), manufacturing/processing factories, waste/water management plants and other industrial/commercial operations. Multiple facilities may further be coordinated and/or centralized through application of the data acquisition and management system of the present invention. As previously described, tags may be associated with various elements of these facilities and information/data provided by these tags is desirably collected and processed reflecting the operation, state, or condition of the individual and collective elements of the facilities being monitored.

A back-end data environment 100 comprises various tag-based systems and non-tag-based systems. These data sources may include, for example, plant floor production systems 102, monitoring/control/reporting systems 103, enterprise resource planning data systems 104, human resource management systems 105, customer relationship management systems 106, and other data systems 107. Data arising from the back-end data environment 100 may comprise point data 110 such as the aforementioned current or real-time operational values and non-point data 112 which arises from or is associated with tag-based systems such as the aforementioned plant floor production systems 102 and monitoring/control/reporting systems 103. Non-point data 112 associated with these tag-based systems may further include attribute information used to characterize, contextualize, or identify the point data 110 and/or point data source.

In addition to tag-based non-point data, non-tag-based non-point data may be associated with various back end system resources such as the enterprise resource planning data systems 104, human resource management systems 105, and customer relationship management systems 106. Conventionally, non-tag-based non-point data 112 may be associated with various database and data management applications that provide such information in a form that is not readily compatible/integrateable with certain components of the tag-based system data for the aforementioned reasons (e.g. format, structure, application-dependence, etc.). As will be described in greater detail below, the various embodiments of the invention overcome these and other limitations providing efficient mechanisms that allow tag-based point and non-point data 110, 112 to be integrated and related within the same environment for purposes including but not limited to management/retrieval/development/review.

The various components of the back-end data environment 100 are connected to an application environment 120 such that the operational data comprising point data 110 and non-point data 112 (both tag-based and non-tag-based) are accessible to the application environment 120 and may be stored and processed therein. In this context, the term connected refers to being directly or indirectly capable of communicating over a direct wired, network or wireless connection. The exemplary application environment 120 may comprise an enterprise server(s) 122 and/or one or more solution servers 126. The application environment 120 may further be connected to a development environment 128. The development environment 128 comprises one or more development clients 130. In various embodiments, the enterprise server 122, solution servers 126 and development clients 130 may comprise application programs developed, for example, in a language such as Java and/or C++ which run under an operating system such as the Windows™ (a product of Microsoft Corp.) family of operating systems.

In various embodiments, the invention provides a mechanism to integrate acquired operational data comprising point data 110 and non-point data 112 in a unified manner using an object-oriented representational model for data acquisition and management. Further provided is a mechanism to customize the data acquisition process by associating configurable acquisition frequencies or fetch intervals for the information to improve overall system efficiency. The configurable acquisition frequencies can be adjusted to accommodate the both point data 110 and non-point data 112, as well as, the rate at which this data will change or be refreshed to provide the application environment 120 with up-to-date information.

The aforementioned informational acquisition and management features desirably improve system performance and decrease bandwidth consumption by avoiding unnecessary or redundant data requests from the back-end data environment 100. More specifically, the system provides options and functionality for conveniently specifying and grouping various information to be fetched from the back-end environment 100 and processed by the application environment 120. In various embodiments, the data grouping functionality utilizes tag collections to model point data acquisitions from one or more point data sources. The tag collections further facilitate defining and modeling components within the back-end data environment 100 and provide a reusable resource that can be used to enhance the development process especially in large or complex systems.

Figure 2:
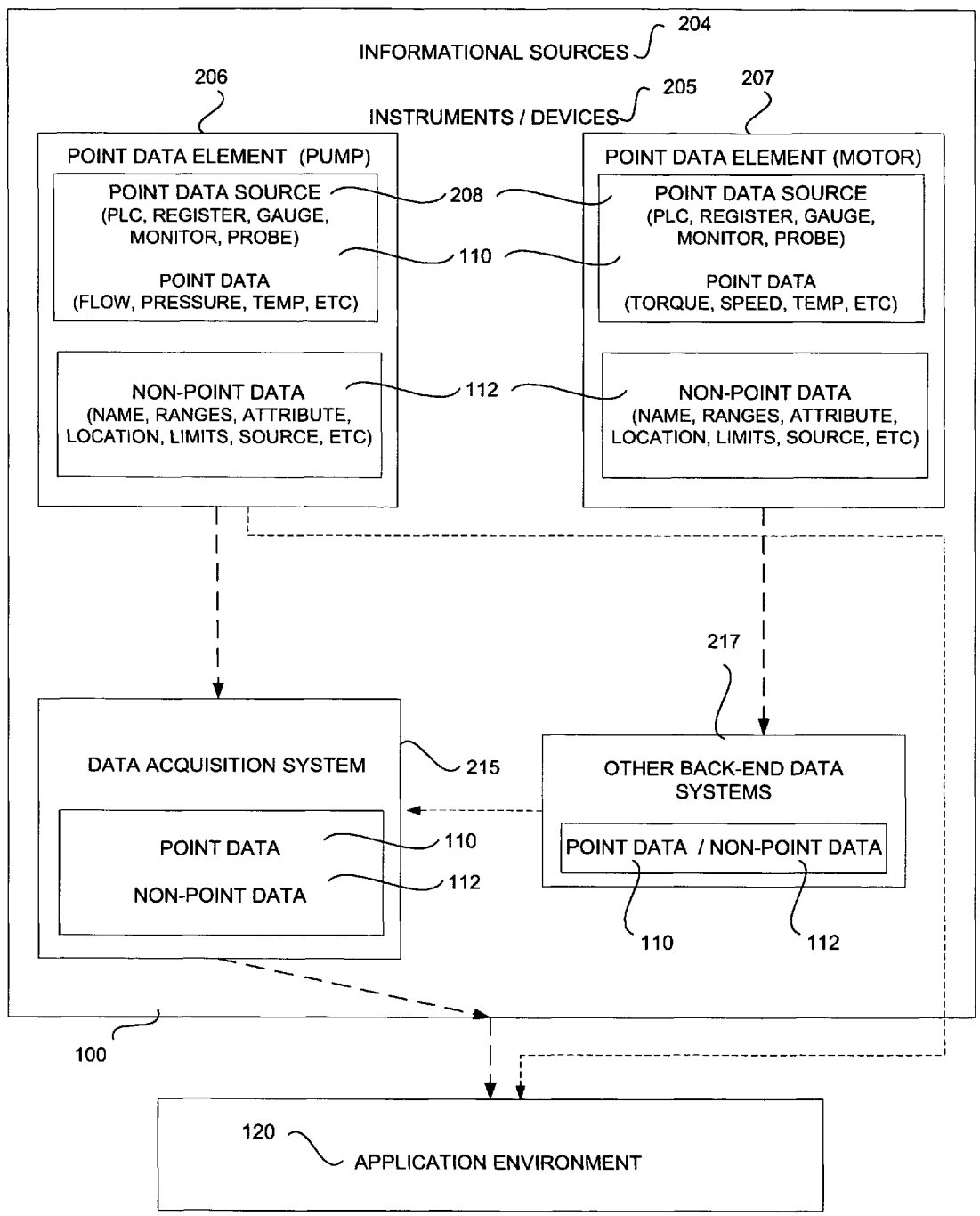
FIG. 2 illustrates informational flow in a system having a plurality of tags associated with one or more point data sources.

FIG. 2 illustrates a block diagram of an exemplary mechanism for association of operational data comprising point data 110 with non-point data 112. In one aspect, the information may arise from a plurality of informational sources 204 associated with a continuous process facility, manufacturing plant or refinery shown by way of example as instruments or devices 205 including an exemplary pump 206 and exemplary motor 207. The informational sources 204 may further comprise point data sources 208 associated with a particular instrument or device 205 including for example; registers, gauges, monitors, or probes from which point data 110 may be generated and subsequently fetched or acquired. Non-point data 112 may also be associated with each informational source 204 including for example; names, ranges, attributes, locations, limits, sources, among other information. Certain non-point data 112 may be provided by a selected informational source 204 in connection with the point data 110, or alternatively, the non-point data 112 may be subsequently associated with the point data 110 as will be described in greater detail below.

In one aspect, point data sources 208 correspond to addressable points of the informational sources 204 associated with various elements/components of the continuous process facility, manufacturing plant or refinery and may be referred to individually as tags. A tag comprises a collection of desired operational data comprising point data 110 and non-point data 112 utilized or processed by the application environment 120. Each tag may further reflect a data structure used for storing point data 110 and/or non-point data 112 acted upon by the application environment 120. It will be appreciated that "point data" and "tags" reflect terms used in various processing and manufacturing industries to define sources of identifiable values for various instrument and apparatus functionalities and features but may also be applied in other contexts and systems.

Each point data source 208 may be associated with a measurable or monitorable feature from which point data 110 may be requested and collected. For a selected instrument or device 205, a plurality of such point data sources 208 may exist with the point data 110 generated by, or associated with, each point data source 208 subject to relatively frequent change and generally representative of a current/real-time state or operational condition of that point data source 208. Point data 110 may further be acquired either directly or indirectly by components of the application environment 120 and associated with non-point data 112 which is recognized by the components of the application environment 120. In various embodiments, association of non-point data 112 with the point data 110 may be accomplished by the instrument 205 or alternatively non-point data 112 associations may be performed by other components of the system. In various instances, association of point data 110 with non-point data 112 may occur substantially transparently to the point data sources 208 and/or various associated back-end data systems 215, 217. In general, non-point data 112 is associated with point data 110 and reflected in the tag data structure. Together this information may be used by the application environment 120 for the purposes of monitoring, control, and analysis and to assess the state or condition of selected instruments or systems within the back-end data environment 100.

Operational data comprising point data 110 and non-point data 112 may be received by a data acquisition system 215 configured to collect information from various point data sources 208 or other back-end data systems 217 associated with corresponding point data sources 208. The data acquisition system 215 and back-end data systems 217 typically provide only limited functionality in terms of data acquisition and management but may serve as a source of point data 110 and non-point data 112 for the application environment 120. Alternatively, the application environment 120 may be configured to acquire point data 110 and non-point data 112 directly from the various back-end data systems 217 and point data sources 208. In such instances, the application environment 120 is capable of interacting with the various components of the back-end data environment 100, systems 215, 217 and/or point data sources 208 to collect information about each desired point data source 208 and associated non-point data 112. Mechanisms for configuring and executing such interactions will be described in greater detail hereinbelow.

It will be appreciated that, point data 110 may originate from many point data sources 208 each having differing volatility or longevity characteristics. In one aspect, these characteristics describe reflect the volatility of the point data 110 wherein certain point data 110 may be characterized as relatively static or infrequently changing and other point data 110 may be characterized as relatively dynamic or more frequently changing. Thus, the point data 110 acquired from the systems 215, 217 or point data sources 208 may posses a wide range of temporal qualities ranging from substantially never changing to changing substantially every instant. One feature of the data acquisition and management system of the present invention is that it provides a mechanism for conveniently associating with each point data source 208, a configurable data fetch or acquisition frequency such that the application environment 120 can be configured to obtain, refresh, or update the point data 110 as needed or desired.

Typically point data 110 comprises a wide variety of different constructions and/or compositions. For example, point data 110 may relate to real-time operational data for an informational source 204 or back-end data system 215, 217 associated with a continuous process facility, manufacturing plant or refinery including temperature, pressure, speed, etc. In certain instances, the point data 110 may be a primitive value not carrying with it a description of the point data source 208 from which it was obtained. In other instances the point data 110 may be associated with non-point data 112 including attribute information which characterizes the point data source 208 (e.g. instrument name) or point data 110 itself (e.g. data units). Certain non-point data or attributes 112 may be further defined for the point data sources 208. These may include for example, operational ranges, point data source names or associations, and other information. The non-point data or attribute information 112 may be assigned by the data acquisition systems 215, 217 used to acquire the point data 110 or may be assigned directly by components of the application environment 120. In various embodiments, non-point data or attribute information 112 reflects more static/less volatile information as compared to the point data 110. Typically, non-point data 112 does not change at the same frequency as the point data 110 itself. As a result the desired acquisition rate or fetch frequency for non-point data 112 may be correspondingly lower.

In one aspect, component builder and solution builder functionalities may be associated with the application environment 120. The component builder provides functionality for defining, generating, managing, and visualizing various component data structures used for point and non-point data acquisition/integration in accordance with various embodiments of the invention. The solution builder provides functionality for creating views or visualizations of components generated with the component builder.

In one aspect, the component builder and solution builder allow point and non-point data 110, 112 to be flexibly organized and presented using a graphically driven approach. In such an approach, a user is able to create one or more components and views in an iconically and menu-driven manner. Furthermore, these builders may utilize intuitive and semi-automated mechanisms for point data and non-point data integration which facilitates design and manipulation of the data 110, 112 at small and large scales alike.

Figure 3A:
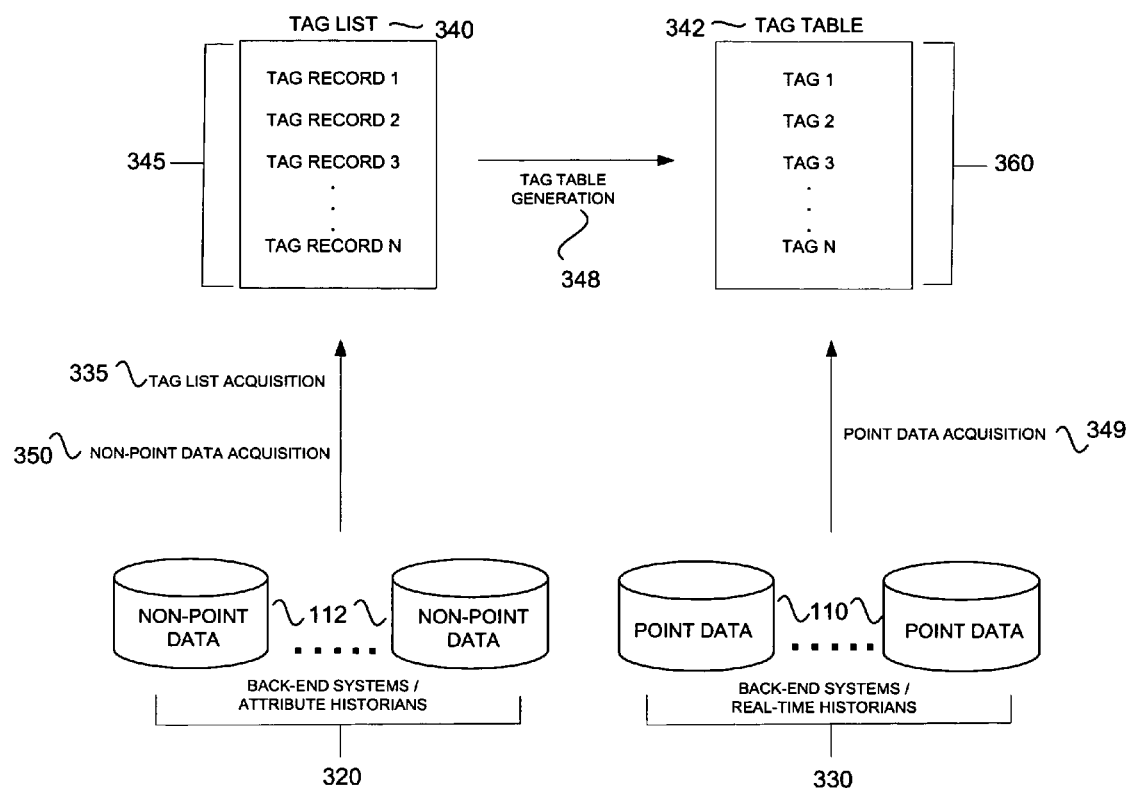
FIG. 3A illustrates a block diagram of an exemplary tag list and tag table.

FIG. 3A illustrates one embodiment of an architecture used for managing point data 110 and non-point data 112 permitting the generation of customized tag configurations. As previously described, point data 110 and non-point data 112 may originate from or be accessed through one or more informational sources 204. These informational sources 204 may further correspond to instruments/devices 205, data acquisition systems 215, and/or other data systems 217 associated with a continuous process facility, manufacturing plant or refinery. The information obtained from the informational sources 204 may be logically organized as originating from back-end systems/historians corresponding to non-point data sources 320 and point data sources 330 providing either non-point data 112 and point data 110 or combinations thereof. These back-end sources 320, 330 may further comprise a plurality of discrete sources, the contents of which may be desirably accessed and used to develop tag-based associations and solutions. For purposes of illustration, back end systems 320 providing non-point data 112 are shown as separate informational sources from back end systems 330 providing point data 112 however it will be appreciated certain back end sources may provide both point data 110 and non-point data 112.

In one aspect, the tag synchronization architecture utilizes data structures including a tag list 340 and a tag table 342. The tag list 340 comprises a collection of one or more tag records 345 corresponding to tags logically or physically present within an instrument, system, plant, business enterprise, organizational enterprise, etc. from which point data 110 is to be acquired and managed. Each record 345 of the tag list 340 may be configured to reflect information characterizing a discrete tag within the system storing identifying data about the tag. This data may include descriptive details about the tag (e.g. name, source, location, and address), access configurations, attribute information, runtime parameters, operational ranges/limits, and other non-point data 112.

In one aspect, the tag list 340 is initially configured to contain tag records 345 associated with tags that are or may be present and accessible in developing subsequent solutions for point data access, management, and/or viewing. Data used to configure the tag records 345 of the tag list 340 may be obtained from back-end data sources 320 which supply a current or desired list of tags as well as tag attribute data/non-point data 112 associated with each tag. The tag records 345 further comprise information for determining how point data 110 may be accessed from the various back-end systems/real-time historians 330. Such information may include the address, location, login parameters, or configuration used to access a selected real-time historian 330 as well as set forth the acquisition characteristics (e.g. frequency of acquisition, mode of acquisition, expected data configuration, etc).

Typically, data contained within the tag list 340 reflects infrequently changing or static information as compared to the actual point data 110. Once acquired, the information for a selected record 345 may be expected to remain substantially constant or updated relatively infrequently. An efficient mechanism by which to obtain the aforementioned information for use in populating the tag list 340 comprises developing/defining a series of queries used to retrieve or pass the non-point data 112 from the appropriate back-end systems/attribute historians 320. These queries may comprise database-like commands (e.g. SQL database queries) which populate the tag list 340 by accessing or obtaining data for each tag record 345 as appropriate.

In various embodiments, configuration and attribute information contained in the tag list 340 relating to each record 345 may be used to populate the tag table 342 with point data 110 obtained from selected back-end systems/real-time historians 330. Information in the tag table 342 comprises one or more tag elements 360 comprising point data 110 associated with a selected tag's real-time or operational value. Back-end data sources 330 supplying the point data 110 may be identified, accessed, and relevant information retrieved or acquired to be subsequently associated with corresponding non-point data 112.

As previously noted, the point data 110 may be characterized as information that is subject to rapid or frequent change. Consequently, to maintain an accurate, timely, or up-to-date reflection of the point data 110, the rate at which the point data 110 is desirably acquired may be increased. In various embodiments, the present invention provides mechanisms to configure polling or subscription frequencies associated with the various tag elements 360 contained in the tag table 342. The rate at which the point data 110 for a selected tag element 360 is acquired or refreshed may be set forth by rule-based and/or event-driven mechanisms. Point data acquisition configurations may further be devised that include an identifier such as a tag name, ID, key, or equivalent which permit appropriate tag attribute settings to be determined using information acquired from the tag list 340. The point data configurations may further provide information setting forth the manner or mode to properly retrieve a selected tag's point data value (e.g. real-time or current values) from the appropriate back-end systems/real-time historians 330.

In one aspect, point data acquisition 349 may be accomplished through publish and subscribe data collection, tag-value connections or by sampling point data 110 that is streamed from selected back-end systems/real-time historians 330. These mechanisms for informational acquisition may be better suited for real-time data acquisition allowing the point data 110 to be refreshed at a desired frequency especially in situations where the refresh rate is rapid. Conversely, non-point data 112 which generally does not require frequent refreshment or acquisition may be better suited to query-based mechanisms as described above and may be configured to avoid imparting undue computational overhead or bandwidth consumption to the information acquisition system.

Using the tag list 340 in connection with the tag table 342 provides a convenient mechanism by which to acquire and store both point and non-point data 110, 112. Additionally, organization of the information in this manner allows for various tag synchronization operations to be performed. As will be described in greater detail hereinbelow, the tag synchronization operations may be used to update the tag records 345 and associated tag elements 360 in a semi-automatic or fully-automated manner.

In one aspect, selected back end sources 320 may be configured to supply information corresponding to a list or collection of tags in a tag list acquisition process 335. The tag list acquisition process 335 sets forth logical groupings or combinations defining how various point data 110 and non-point data 112 will be subsequently associated. In one aspect, a tag list 340 is developed by the tag list acquisition process 335 comprising a plurality of tag records 345 representing desired associations of point data 110 and non-point data 112. The tag list acquisition process 335 may further set forth associations that provide configuration information that aid in determining the specific back end data source from which that non-point 112 and/or point data 110 is to be acquired.

A computerized system implementing such features may provide a generator module for defining/deploying a data solution utilizing the aforementioned information. Additionally, as will be described in greater detail hereinbelow, processes for informational synchronization may be implemented in such a computerized system through a synchronization module with a runtime module capable of interpreting the data solution and acquiring the information according to a desired configuration.

Using the aforementioned configuration information, each tag record 345 may be populated with information by a non-point data acquisition process 350 wherein one or more back-end data sources supply or are accessed to supply the non-point data 112 in an appropriate manner. For example, tag lists 340 and non-point data 112 may be obtained by database query language queries such as SQL (Structured Query Language) or SQL-like queries. Such a query may be used to acquire the entire tag list 340 as well as each non-point data element 112 to be associated with the tag records 345. Such queries 315 are typically well suited to access and retrieve generally static information which changes relatively infrequently (e.g. non-point data 112).

The tag list acquisition process 335 and non-point data acquisition process 350 may both be configured as periodic or event-driven events wherein the list 340 of tag records 345 and the corresponding non-point data 112 (e.g. attributes) are acquired as desired. For example, these processes 335, 350 may be configured to be executed at pre-designated times or intervals to insure the tag list 340 comprises up-to-date information. Alternatively, these processes 335, 350 may be configured to be executed based upon a selected event such as the introduction of a new informational source, back-end source, or tag to be managed and/or monitored by the system. It will be appreciated that other mechanisms for determining, acquiring, and populating the tag list 340, tag records 345 and non-point data 112 may be readily devised without departing from the scope of the invention.

Configuration of the tag list 340 may include performing operations for the acquisition of appropriate non-point data 112 used for populating each tag record 345. In one aspect, these operations comprise generating and/or executing configuration parameters and access instructions to retrieve the non-point data 112 from one or more back-end systems/attribute historians. One desirable feature of the system is reflected by the ability to aggregate non-point data 112 from a plurality different sources collecting the information in a centralized manner where is may be more conveniently organized, managed, and utilized.

Once the tag list 340 has been developed, the tag table 342 is constructed by a tag table generation process 348. Tag elements 360 of the tag table 342 may be identified based on tag records 345 present within the tag list 340. Likewise, suitable configuration/access parameters as well as point data acquisition strategies may be identified using the tag list 340. Taken together this information provides a mechanism by which to populate the tag elements 360 with appropriate point data 110 at the desired interval(s).

Figure 3B:
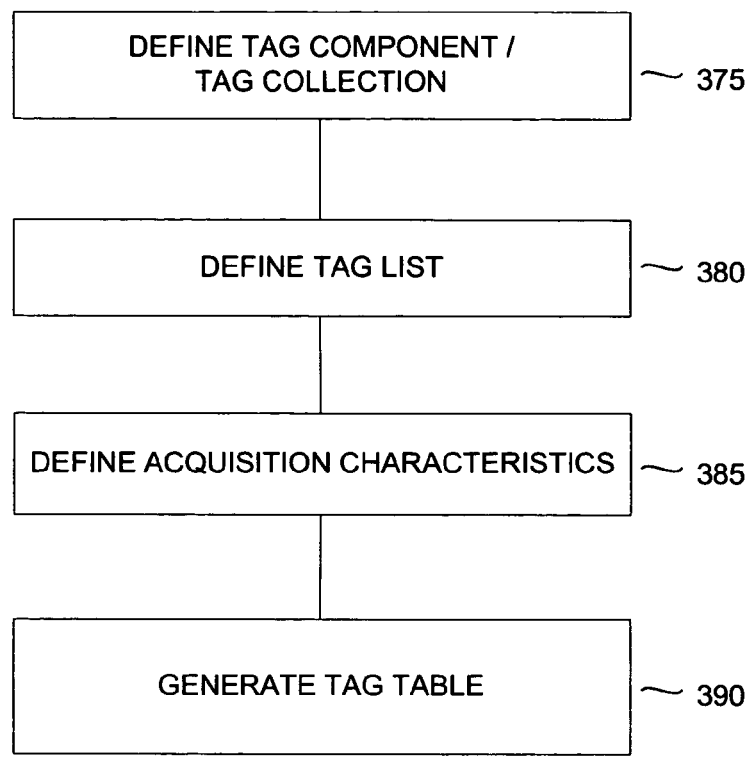
FIG. 3B illustrates a process for developing a tag list and tag table.

FIG. 3B illustrates an exemplary method 370 setting forth the principal steps for tag solution setup corresponding to the tag solution illustrated in FIG. 3A. The method 370 commences with a tag component definition state 375 wherein the tags and corresponding point data 110 and non-point data 112 that will form the solution are defined. In one aspect, defining the tag components may further comprise developing logical groupings of tags in the form of tag collections. As will be described in greater detail hereinbelow, tag collections may be used to organize the solution by associating various tags that correspond, for example, to particular systems, devices, instruments, regions, processes, activities, etc.

Based on the characteristics of the tag components and tag collection, the tag list is defined in state 380. The tag list 340 is generated as previously described wherein appropriate connections and acquisition strategies to access various back-end systems/attribute historians are set forth so that non-point data 112 may be retrieved to populate that tag records 345 of the tag list. Additionally, the tag list 340 contains information describing how tag records 345 of the tag list 340 and tag elements 360 of the tag table 342 will be associated (e.g. point data and non-point data associations). In various embodiments, selected information from the tag records 345 (e.g. attribute information) is used to contextualize the tag elements 360 and this information is provided upon user request or during presentation of the tag in a view.

In state 385, acquisition characteristics suitable for retrieving point data 112 may be defined. For example, the desired frequency of acquisition or sampling of selected point data 110 may be configured. Typically, the frequency of acquisition is configured on the basis of the expected volatility or dynamic change expected in the point data per unit time. In certain instances, it may be desirably to configure point data acquisition multiple times per hour, minute, second, sub-second increment, etc. The system desirably allows point data acquisition strategies to be customized for tags both individually and in groupings as desired. Additionally, default acquisition strategies may be implemented whereby an acquisition strategy is automatically assigned without manual configuration.

In state 390 the tag table 342 is generated whereupon tag elements 360 are populated with point data 110 from selected sources 330. In one aspect, generation of the tag table 342 occurs by accessing information from the tag list 340 which sets forth tag elements 360 that will be present in the tag table 342 and provides connection and configuration information used to acquire the point data 110. Additionally, the previously defined acquisition strategies may be utilized to determine how to acquire the point data 110 and the rate at which it will be refreshed.

Taken together, the information in the tag list 340 and tag table 342 may be accessed in various manners to provide point data 110 and non-point data 112. In one exemplary usage, this information may be accessed for the purpose of generating selected views in which tag-based information is displayed to a user. While the aforementioned discussion has described the tag list 340 and tag table 342 as logically separate entities it will be appreciated that numerous implementations and schema exist to achieve the desired functionality. For example, defining the tag list 340 and tag table 342 may be accomplished using a singular data structure or a plurality of discrete tables, arrays, records, etc. Consequently, the scope of the invention should not limited to any one manner of organization or implementation and may be executed in various manners without departing from the scope of the present teachings.

In developing tag-based solutions context changes to the solution may be expected to occur subsequent to its initial setup. In applications having many tags being monitored, various devices/equipment may be added, removed, replaced, altered, etc. on an ongoing basis. Changes to the underlying tags of a system supplying point data to a solution can represent a significant problem in terms of maintaining consistency and accuracy of the solution. For example, certain instruments (and their associated tags) may be desirably removed from a system while others may be added. In conventional systems, such changes create significant issues in terms of retooling the solution. Oftentimes, painstaking manual redefinition of the solution must be performed. These operations are typically time consuming and subject to errors potentially corrupting the integrity of the solution.

One feature of the present invention is to provide a mechanism by which to synchronize or update the solution in an automated or semi-automated manner to reduce or eliminate the aforementioned problems. In one aspect, tag synchronization according to the present teachings desirably facilitates the addition, removal, or updating of tags, non-point data, and point data connections. These operations can be configured to execute periodically thus detecting and accommodating changes to the solution on an ongoing basis or may be executed upon request. For these and other reasons, implementation of the invention provides enhanced abilities to normalize, consolidate, and unify data in the context of tag-based information management.

Figure 4A:
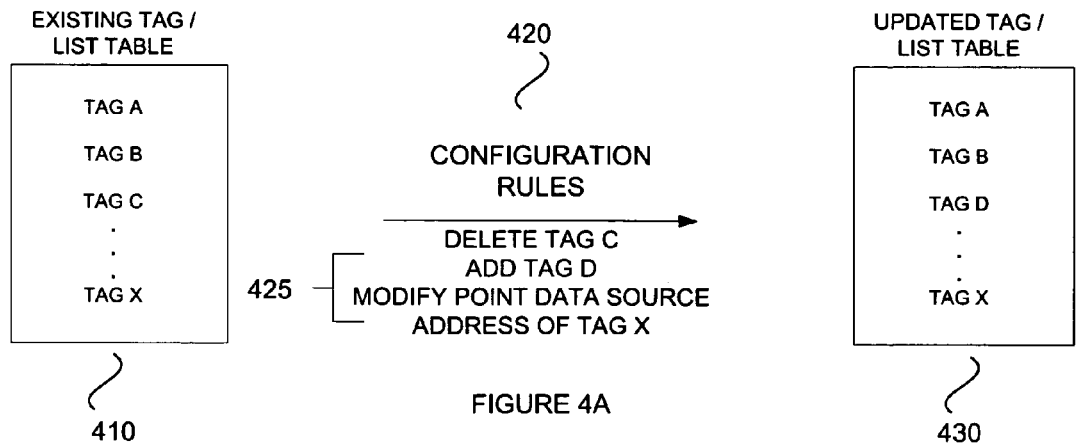
FIG. 4A illustrates a block diagram for applying configuration rules to a tag table.
Figure 4B:
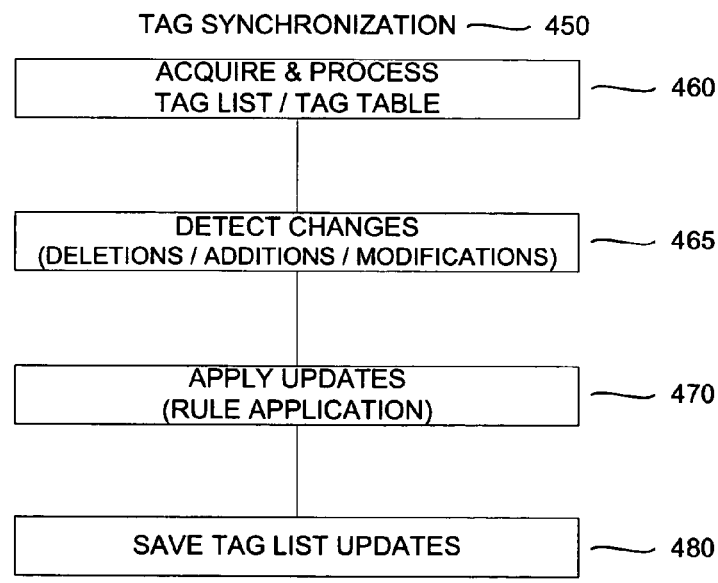
FIG. 4B illustrates a tag synchronization process for managing tag table contents.

FIGS. 4A and 4B illustrate an exemplary tag synchronization process for detecting changes to a tag-based solution. As shown in FIG. 4A, tag synchronization may be achieved using an existing tag list/tag table 410 to which selected configuration rules 420 are applied. In one aspect, these rules 420 provide the ability to detect changes that may occur in the tag list/tag table 410 which may include, for example: removal of tags (deletions), addition of tags (additions), and/or modifications to tags (address/connection configuration changes). The tag list/tag table 430 provided following application of the configuration rules 420 therefore reflects those changes that have been made to update the tag list/tag table 410.

The configurations rules 420 may include mechanisms by which to compare the existing list/table configurations to the updated or desired list/table configurations or to recognize when changes to the existing list/table configuration is necessary. For example, in an exemplary operational environment, a selected tag "C" may become antiquated or outdated and no longer needed to be represented in the tag solution. This may result from removal of the underlying instrument, device, or component associated with the tag or from its updating/replacement with a component with different tags/associations.

In general, it is desirable to be able to quickly and efficiently recognize such a change in a tag associated with the solution and modify the solution to reflect the change in the tag to preserve system resources and maintain an accurate reflection of "active", "viable", or "existing" tags. Similarly, connections, references, components, and/or other data structures that may refer to the tag should be updated as necessary to preserve integrity within the logical schema and associations of the solution.

In an analogous manner a selected tag "D" may represent a tag to be included in the tag solution. This tag may reflect recently added tag-based connection information associated with the addition of an instrument, device, or component that was not previously associated with the solution. Additionally, the selected tag "D" may represent a new/updated tag-based connection to an existing component. As with the removal of antiquated/outdated tags, it is desirable to be able to quickly and efficiently recognize and configure the added tag making its contents and information accessible in the solution.

Additionally, tag modifications may be desirably implemented to change various point data, non-point data, and configuration information associated with the tag. These modifications may be desirably performed on a Tag "X" resulting in changes to the underlying information contained within the tag. Such modifications should be recognized within the system and appropriate actions taken to preserve integrity within the logical schema and associations of the solution.

Inclusion of the tag synchronization functionality within the system desirably provides a convenient and simplified method by which to address the aforementioned operations in a consistent and timely manner. Additionally, the tag synchronization functionality avoids, flags, or identifies the potential introduction of errors/discrepancies into the solution which may result from modifications to tags.

FIG. 4B illustrates an exemplary tag synchronization method 450 configured to perform various tag synchronization operations upon the tag list/tag table. These operations may include evaluating the tag records of the tag list and determining if selected records are up-to-date or current with respect to the desired tag solution. Tag list management according to these operations may further comprise performing functions such as: determining whether information contained in the tag list should be updated to reflect new configurations (e.g. added tags); determining whether tag record(s) should be removed from the tag list (e.g. deleted tags); or determining whether the tag records and/or the tag list have been modified from a previous version.

In an exemplary application of the method 450, contents of the tag list/tag table are acquired and processed in a state 460. Acquisition of the appropriate information is set forth by the configuration rules with identify relevant tags and associated tag-based information which make up the existing tag list/tag table 410. Thereafter, in state 465, changes to the solution are identified. These changes may represent added, deleted, or modified tags including various information contained therein. In one aspect, tag changes are detected and resolved using the configuration rules which compare the content of the existing tag list/tag table 410 to the updated or new tag list/tag table 430. A script or series of operations may be generated during this state which sets forth the operations necessary to transform the existing tag list/tag table 410 into the desired update tag list/tag table 430.

In state 470, the updated tag list/tag table 430 is generated reflecting the previously identified changes. In one aspect, the script produced in state 465 defining the desired tag operations is executed producing the updated tag list/tag table 430. This script may further include information identifying the contents of the updated tag list/tag table 430 as well as information identifying the differences between the existing tag list/tag table 410 and the updated tag list/tag table 430. The script may be encoded as a file in a markup language such as XML which may subsequently be parsed and executed to perform the various operations associated with the tag synchronization process. In one aspect, this information may be used in subsequent rounds or iterations of the tag synchronization process to determine appropriate changes/modifications to be made. Thereafter, in state 480 tag list/tag table changes may be saved including information detailing the progress/results of the synchronization process including: completion time, date stamps, status messages, errors, and other information. Additionally, non-point data and point data acquisition routines may be invoked to populate the tag list/tag table 410.

As previously described in FIG. 3A, tags 360 contained in the tag table 342 are populated with point data 110 and non-point data 112 through acquisition strategies that identify appropriate informational sources and retrieve data to be associated with selected tags 360. In various embodiments, when acquiring point data 110, the specific point data source(s) 330 providing information are resolved and associated with one or more tags 360 through selected querying mechanisms.

Figure 5A:
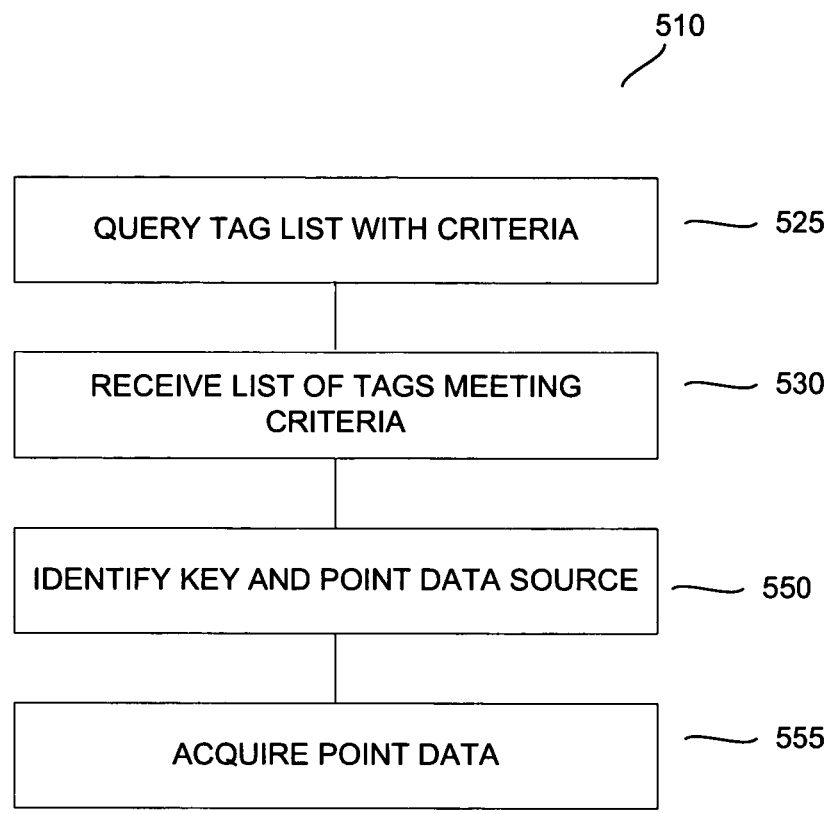
FIG. 5A illustrates a process for point data acquisition from at least one point data source.

FIG. 5A illustrates an exemplary method 510 for point data acquisition and association with selected tags 360. Operationally, this method 510 may be analogized to a querying approach wherein tags 360 are treated as a list. The method 510 commences in a state 525 wherein selected criteria are used to query the tag list 340. This criteria results in the return of a list of one or more tags that meet the criteria or are within the parameters set forth by the criteria. For example, the criteria used to query the tag list 340 may comprise one or more tag IDs, tag identifiers, tag keys, aliases, or other such information useful in identifying specific tag records 345 from the tag list 340. The querying criteria may further include information that identifies selected non-point data or attribute information 112 contained within the tag list 340 and associated with particular tag records 345 that may be used to access the point data 110 from the point data source(s) 330. This information may include, for example, addressing information, point data source name/ID/location, acquisition parameters, network commands, communications commands, connection frequency, configurations, permissions, access parameters and other information that is used to locate and access the appropriate point data source 330.

In state 550, the information returned from the querying criteria is used to associate a selected tag 360 within the tag table 342 with a selected point data source 550. This process may include identifying a particular tag 360 using the key or alias denoting the location where the point data 110 will be stored. In state 555, the point data 110 is acquired using the aforementioned information obtained from the tag list 340 to establish a connection to the appropriate point data source 330 and is associated with the selected tag 360. In this manner, point data may be "linked" or stored such that it made accessible through the tags 360 of the tag table 342.

In one aspect, the aforementioned method for point data acquisition provides a flexible mechanism by which to access and utilize point data 110 within the system. Management of tag-based information is facilitated through the use of the querying criteria in connection with both the tag list 340 and tag table 342 wherein changes to these components can be made to reflect new system configurations, modification of various point data sources, and other factors that may affect the manner in which point data 110 and non point data 112 are accessed within the system. These changes can be detected and propagated through the configuration rules 420 which are able to automatically or semi-automatically update the tag list 340 and/or the tag table 342 as necessary or desired. Thus system integrity and data accessibility may be managed in a manner previously unavailable. Such features are particularly significant in the context of complex systems with many informational sources and tags where manual redefinition and maintenance of tag-based information is both tedious and error-prone.

Figure 5B:
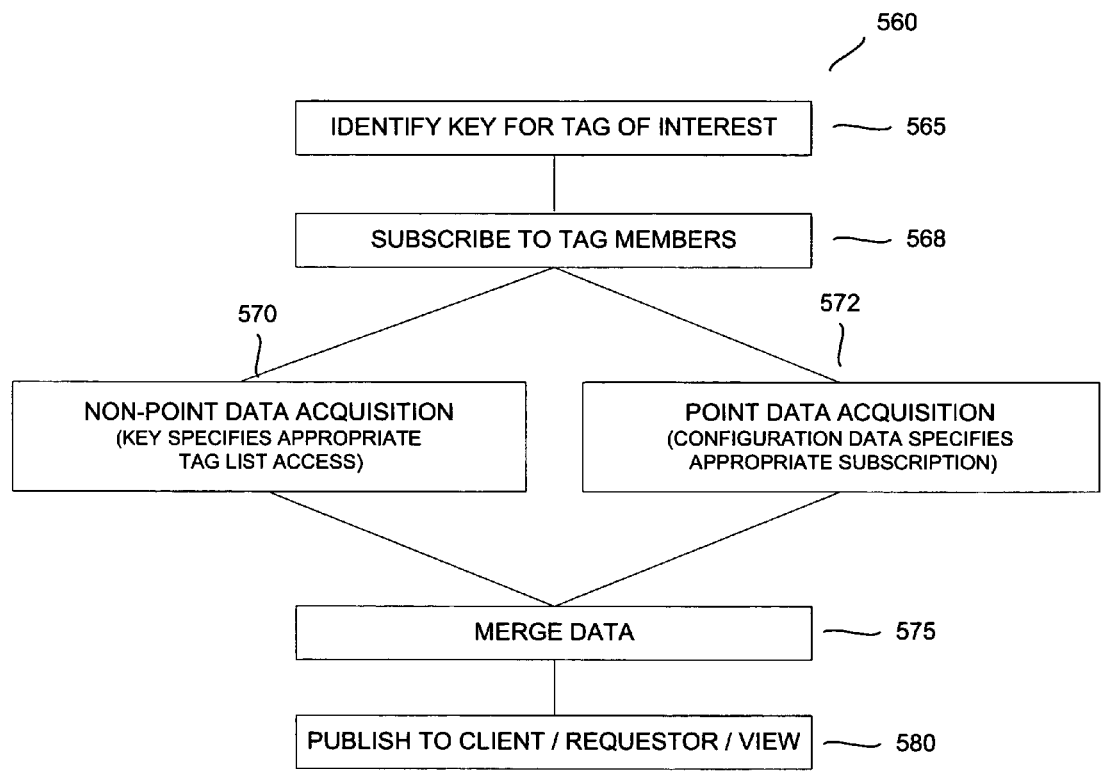
FIG. 5B illustrates another process for point data acquisition from at least one point data source.

FIG. 5B illustrates another exemplary method 560 for point data acquisition and association with selected tags. Operationally, this method 560 that may be analogized to a querying approach wherein tags are treated as objects. The method 560 commences in a state 565 wherein a tag key or alias is identified. Each tag key provides a manner in which to uniquely reference data objects contained in the tag list 340 and tag table 342. In one aspect, individual tag keys are associated with the tags 360 of the tag table 342 and provide a mechanism by which to reference the data contained within a selected tag 360 by a data call or pointer to a selected tag object and its constituent elements. Upon identification and resolution of the tag key, the method 560 proceeds to a state 568 where subscriptions/acquisitions of appropriate point data 110 and non-point data 112 are made. As shown in state 570, non-point data acquisition may proceed using the tag key to reference appropriate tag list members to supply non-point data to the selected tag 360. Likewise, point data acquisition, as shown in state 572 may be accomplished using the tag key which identifies appropriate point data subscriptions that are invoked to acquire the desired information. In one aspect, configuration/attribute data is provided during the subscription process using at least a portion of the non-point data 112 acquired in state 570.

In state 575, the point data 110 and non-point data 112 are merged in the appropriate tag data object 360 of the tag table 342 using the tag key as a reference. The structure of the tag data object 360 in connection with the configuration information determines how the data 110, 112 is stored and provides for its subsequent accessibility. In state 580, point data 110 and non-point data 112 associated with particular tags 360 contained in the tag table 342 is made accessible to other components of the system for purposes of publication, presentation upon request, or viewing as desired.

The aforementioned methods 510, 560 for data acquisition improve the flexibility of point data/non-point data association alleviating much of the programmatic complexity from a user perspective. Additionally, these methods provide a solution capable of handling highly-complex data access schemas that may be scaled and reconfigured as desired with a significantly reduced overhead as compared to conventional designs. As will be described in greater detail hereinbelow, the use of a key-based referencing system further provides for simplified data access and facilitates joining varied data types preserving logical integrity throughout the system.

FIG. 6A illustrates exemplary tag component definitions 600 that may be used in connection with the present teachings. Each tag definition 600 represents an ordered data structure which may comprise one or more members 620. Each member may further be associated/populated with selected point data 110 or non-point data 112 as desired. In general, the tag component definitions provide a logical framework for associating point data 110 and non-point data 112 in a user-selectable/configurable manner. The simplified example described below represents a framework for components associated with a continuous flow system such as a refinery. It will be appreciated, that an actual operational system might be expected to comprise additional/different tags as compared to those depicted wherein suitable modifications to the logical framework and point data/non-point data relations are made based on the present teachings to enable control/monitoring/management functionalities as desired. If will further be appreciated that the tag component definitions may be constructed so as to allow the data to be used in a variety of different contexts without being constrained to a particular point data/non-point data association or representation.

Tag component members 620 may be mapped to or associated with selected information contained in the back-end systems/historians 320, 330 using the key-based approaches described above. Population of the component members 620 may further utilize a simplified command/referencing language that may be translated by the application environment. The format of the commands of the language may allow for a more intuitive understanding of the operations to be performed in mapping the information without having detailed knowledge of the underlying operations themselves.

In the exemplary tag component definition for "Tag" 610, tag component members 620 may comprise limits or ranges each having associated member type (e.g. real, integer, boolean, string, etc.). Each tag component member 620 may further be associated with selected type of point data 110 or non-point data 112. For example, the range component members each may be associated with non-point data information representing operational limits for an instrument or device. Similarly, other tag component members 620 may include values 622 (e.g. real-time or operational point data values), attribute information 626 (e.g. units associated with the values 622 and parameters contained within the tag component 610), and configuration information 628. In one aspect, the configuration component member 628 may be used during the synchronization processes to identify components that are to be updated, deleted, etc.

A key member or alias 624 serves as a unique identifier for the tag component 610 permitting its selection and access to constituent component members. In the illustrated example, the component member "TagName" serves as the key for the tag component and has an associated member type of string.

Other component members may be built from or include at least a portion of the information of another tag component. For example, an "Area" component 650 may be defined from "Pump" components 630 and "Conveyor" components 640. As shown the "Area" component comprises component members 660 intakepump and outletpump of type "Pump" and component members 670 "conveyor1" and "conveyor2" of type "Conveyor". Similarly, a "Plant" component 680 may be defined as comprising a component "Area1" 680 of type "Area". Thus, higher level components may be built or defined using other components as desired. This manner of structuring components provides for a logical mechanism by which to associated tags and information within groupings that facilitate organization of information in complex environments.

As distinguished from other mechanisms for tag component definition the aforementioned approach removes the requisite need to model (e.g. create object instances) of individual tags for the purposes of securing access to the tag and its associated data. Additionally, these mechanisms provide more automated way to define tags based on tag meta-data that may be obtained in the form of a collection. Overall, the process of synchronization with back-end historians can be configured to be automated and efficient enough to provide on-line synchronization for systems with a several hundred thousands of tags. Implementation also allows support of different data type tags obtaining data from multiple historians. Additionally, tag-component definition facilitates access to tag-based information especially in complex calculations.

Figure 6B:
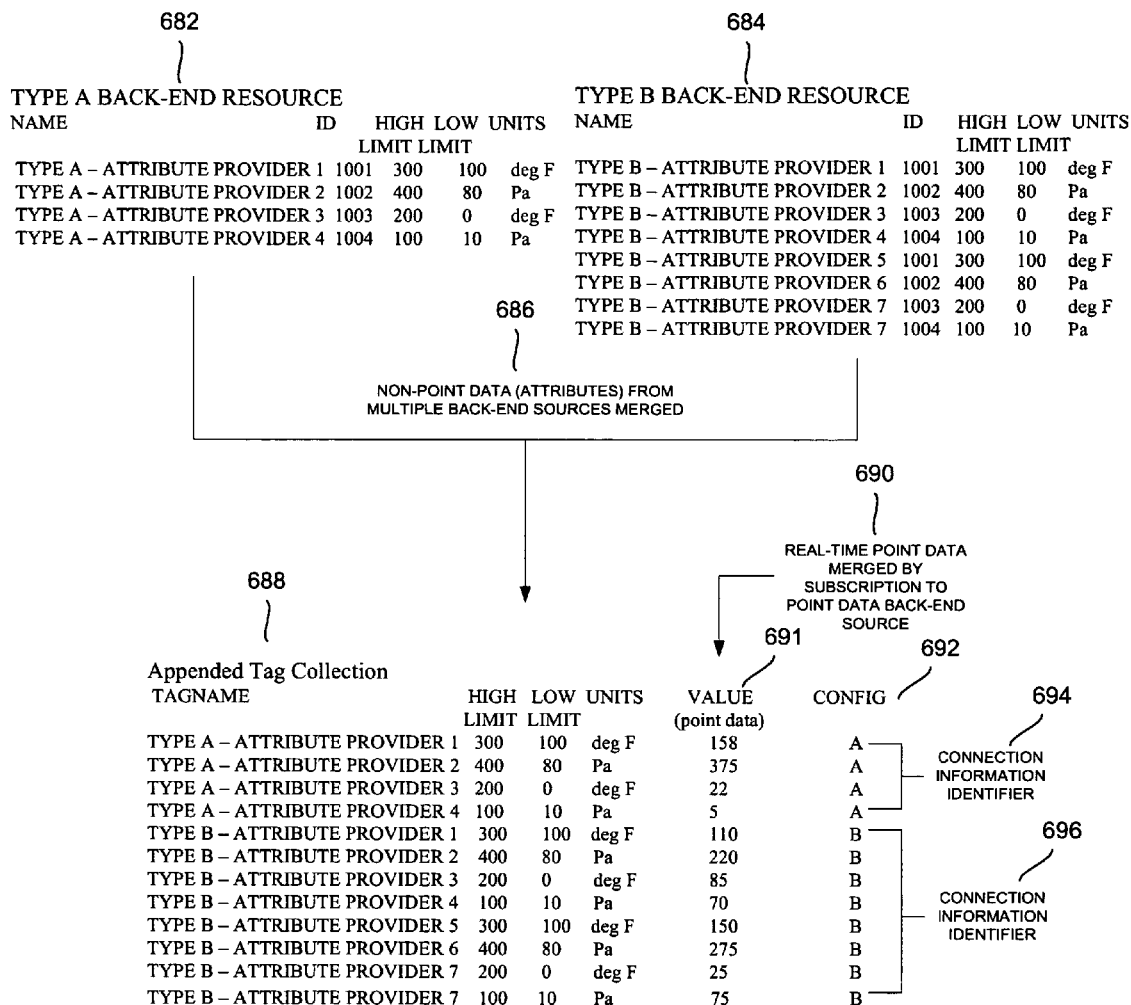
FIG. 6B illustrates an exemplary appended tag collection developed using information from various back end resources.

FIG. 6B illustrates an example of how back-end systems may provide access to point data 110 and non-point data 112 using the aforementioned tag component definitions 600. Various back-end resources 682, 684 may be configured to provide non-point data/attribute information 686 accessed from non-point data attribute historians 320 which may be merged into an appended tag collection 688. The appended tag collection 688 represents selected information from the back-end resources 682, 684 that has been combined in a desired logical grouping. In one aspect, non-point information (e.g. tagname, high limit, low limit, units, etc.) from each back-end resource 682, 684 may be further associated with point data 110 stored or represented within a point data member 691 (e.g. value). This point data 110 may represent real-time data merged by subscription to appropriate back-end data sources. When so combined, the point data 110 and non-point data of the appended tag collection provides the ability to visualize and group the data while preserving capabilities associated with each data type.

It will be appreciated that in the above illustrated figures, the tables, information, and structure shown are exemplary and other embodiments of the present teachings may be represented in different manners. Likewise, the column names and parameters shown above for these systems are also meant for purposes of illustration and should not be construed as limiting upon the scope of the invention. Furthermore, the actual column names and method for storage of the tag data and attributes from various systems implemented according to the present teachings may differ from that of those shown.

In one aspect, the config component member 692 operates as a flag or identifier to be used to specify connection information for a particular back-end resource. For example, data access may be provided to the first back-end resource 682 using a selected set of configuration parameters identified by a first configuration 694 (e.g. "A") while data access to the second back-end resource 684 may be provided by a second configuration 696 (e.g. "B"). In this manner, the specific connection requirements of each back-end resource may be identified and stored within the appended tag collection for use as needed or desired.

Based on the information shown in FIGS. 6A and 6B, the following discussion represents an example of how a tag solution may be implemented in the context of two back-end data sources. In one aspect, the solution generation process commences with the defining of a solution comprising a top level component (e.g. "Plant"). At this time "fixed" objects contained within the solution may be created as well as other components contained within components and sub-components of the top level component. Subsequently, back-end connectors may be defined to link the tags to the appropriate back-end data sources (e.g. Type A and Type B Back-end Resources in the illustrated example). An important feature of this process is that it desirably provides a means for joining information arising from independent sources of tags allowing them to be consolidated into one single unified tag list.

Following back-end connector determination, one or more connector groups may be defined. For example, in a relatively simple case where only one acquisition "strategy" is required to import data into tags from one back-end system only a single connector group per back-end system may be necessary. Multiple connector groups per back-end source may also be defined as desired and those of skill in the art of tag-based system management will appreciate benefits and application of multiple connector groups, or equivalent methods, per each source.

A typical connector group specification may comprise: a hostname (or analogous approach to identify the relevant system), authentication information if needed (e.g. username and password) to provide secure access and connection to the back-end source, poll rate/trigger-method definitions, and other relevant connection specifications that can apply to one or more tags or tag values originating from a single back-end source.

Thereafter, a collection (e.g. record set) may be defined for each back-end system configured to supply tags. Each of these collections may be associated with the component type "Tag". Thus if there are two back-end systems, which are independent sources of tags, then 2 collections (record sets) may be used to bring tag attribute data and the tag list for the back-end system into the application environment. Using a "querying" method (e.g. API or SQL) information may be read or interpreted from the tag list and the tag attribute data from the back-end source.

Mapping of the "columns" of the "querying" method to the object members of the Tag component may also be defined to more fully treat the tag and their data as an object in the general software sense. A "tag" collection (record set) may also be defined representing the collection that is going to be used to manage tags. This may further be used to create a set of objects and list to create the tag table 342. It will be appreciated that the tag table 342 can be implemented in a variety of different methods. Additionally, if only one source of tags exists then the step of mapping and tag collection definition may be collapsed into a single step.

For the exemplified collection of component type "Tag", the collection may be defined as a component type "Tag". If separate collections were previously defined then this step may serve to perform the equivalent of a database append so that the collection contains substantially all the tags from all the collections defined in the previous step. Such operations provide the benefit of using the tags within a single consolidated set/list. As a consequence, browsing/searching through the tags across multiple back-end systems can be achieved.

It is noted that the value member 691 may reflect point data 110 associated with a relatively rapidly changing value that may be acquired by subscription to get the current value for this member. Additionally, the config member 690 reflects an approach to provide useful or necessary parameters to the process that generates connection configurations for each tag. In various embodiments, each record in the collection possesses a corresponding "tag" object where the configuration information for the "tag" is maintained. The config member 690 may reflect a special "attribute" that may be passed along with the "key" attribute (for example with the tagname member 624) to the process that generates tag configurations. Used in this manner the config member 690 and its corresponding value permit the configuration generation process to distinguish between various back-end resources. This allows the value member 691 to be properly populated with information from the appropriate back-end system/data historian.

Figure 7:
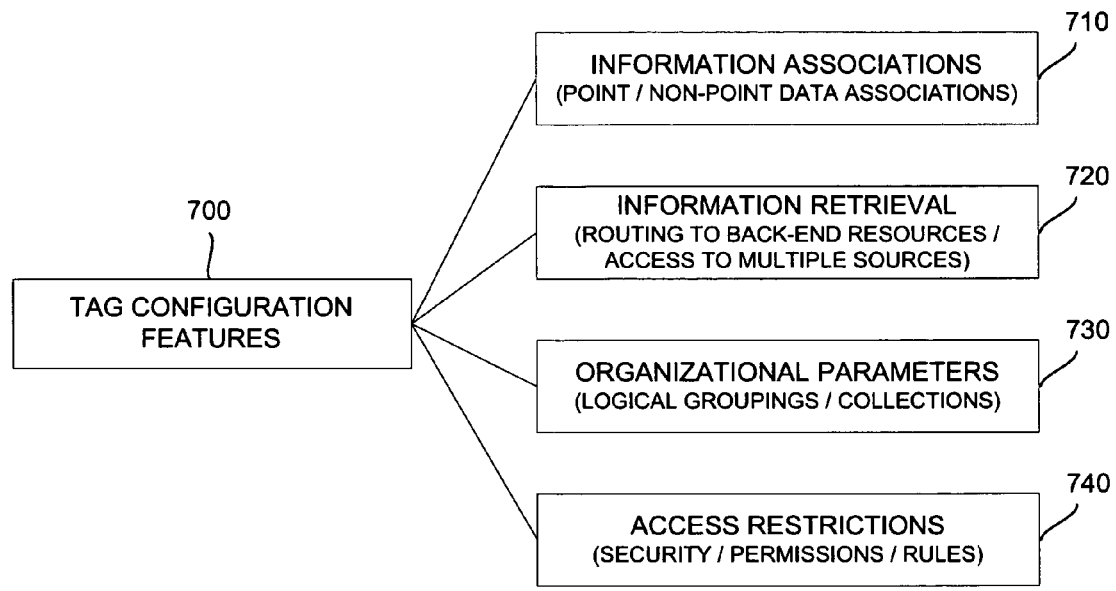
FIG. 7 illustrates a block diagram of various features associated with tag configuration according to the present teachings.

FIG. 7 summarizes some of the more significant tag configuration features 700 provided by the invention. As previously described, these features include flexible information associations 710 allowing point data 110 and non-point data 112 to be associated in highly configurable and logical manners. Included is the ability to recognize changes to the data structures that contain the point and non-point data and to process updates to these data structures as necessary or desired. In one aspect, dynamic updating of tag configurations may be accomplished when tag definitions and/or back-end resources are added, deleted, or modified. Additionally, the invention provides improved information retrieval capabilities 720 including the ability to route information from back-end resources. This functionality includes the ability to distinguish between multiple sources and selectively access and retrieve information from these sources as desired.

A further feature of the invention is the ability to provide useful organizational parameters 730 allowing for customizable groupings and collections of information. These groupings may be conveniently defined as desired without having to fundamentally alter the logical associations already present within the system. This feature improves system stability and avoids data corruption, normalization inconsistencies, and the formation of invalid associations. Furthermore, unlike conventional approaches with limited data accessibility, the present invention provides mechanisms for flexible access to information within the system in new ways. One particular benefit to these approaches is the ability to draw together information that was previously structurally bound.

Finally, as will be described in greater detail hereinbelow, a further feature of the invention is the ability to provide access restrictions 740 through the tag component and member configurations. These access restrictions 740 may include defining security limitations preventing data from being viewed, modified, or accessed without designated credentials. Additionally, the access restrictions 740 may be used to effectuate of permissions and rules such as those used to limit views of data for selected purposes. In one aspect, these restrictions may be applied at various levels and may include components, tag, members, and various combinations thereof.

Figure 8:
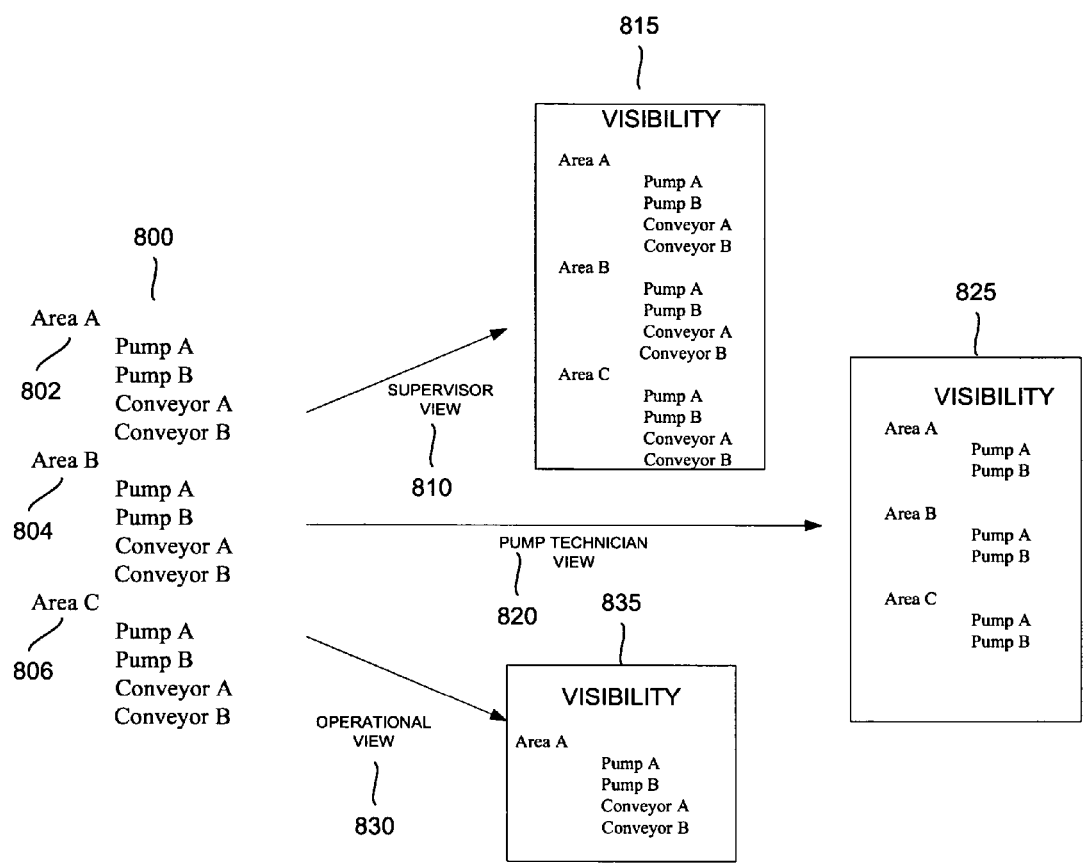
FIG. 8 illustrates exemplary visibility and organizational classifications for a tag collection.

FIG. 8 illustrates one exemplary implementation of various access restrictions or security rules 740 to selected point data and non-point data associated with a tag solution 800. The tag solution 800 may comprise various areas 802, 804, 806 (e.g. Areas A, B, C) each of which have component members (e.g. pumps A/B, conveyors A/B). Selected views 810, 820, 830 may be defined that give rise to differing visibilities 815, 825, 835 of the data contained within the solution 800. For example, a supervisor view 810 may be defined which has access to substantially all of the components of the solution 800 whereas a limited technician view 820 may be defined to provide access to a selected component or collection of components. As shown in this example, the technician view 820 may provide visibility for pump components within the solution 800 included from one or more areas. Similarly, the operational view 830 may limit visibility of components to those associated with a particular area 802, 804, 806.

Based on the aforementioned principals, data restrictions may be configured in numerous ways to provide numerous customizable access strategies. Additionally, data permissions such as through the use of password protection and credential verification may be implemented to permit various levels of access to the data. For example, access limitation to viewing or modifying contents of the tag list/tag table may be provided as well as limitations to viewing or modifying selected components contained therein. The utility in providing such functionality in the context of a tag-based management system will be recognized by those of skill in the art. Benefits of such an approach include restricting access to sensitive information and avoiding burdening selected users with unnecessary information in addition to dividing visibility of the data into logical collections.

Although the foregoing description of the present teachings has shown, described and pointed out novel features of the invention, it will be understood that various omissions, substitutions, and changes in the form of the detail of the apparatus as illustrated, as well as the uses thereof, may be made by those skilled in the art without departing from the spirit of the present invention.

The invention claimed is:

1. A computer implemented method for aggregating operational data acquired from at least one back-end resource, the method comprising:
providing point data and non-point data including data contextualizing the point data;
providing a first data structure with a current configuration for storing the non-point data, wherein the non-point data is acquired, for storage in the first data structure, from the at least one back-end resource at a first acquisition frequency;
providing a second data structure with a current configuration for storing the point data, wherein the point data that is stored within the second data structure is acquired, for storage in the second data structure, from the at least one back-end resource at a second acquisition frequency defined by the current configuration of the first data structure, the second acquisition frequency being different from the first acquisition frequency;
assessing the current configuration of the first data structure and providing modifications to achieve a desired configuration for the first data structure;
assessing the current configuration of the second data structure and providing modifications to achieve a desired configuration for the second data structure;
modifying the first and second acquisition frequencies, as necessary, to store the point data and the non-point data within the first and second data structures according to the desired configurations; and
performing a synchronization process at designated times or designated time intervals to automatically detect and process changes to the first and second data structures;
wherein the performing a synchronization process at designated times or designated time intervals to automatically detect and process changes to the first and second data structures comprises:
using configuration rules to identify a record to be removed from the current configuration of the first data structure to reflect a change desired as a result of removal of an instrument from an operational environment;
developing a tag list by a tag list acquisition process that (i) sets forth logical groupings or combinations defining how various point data and various non point data will be associated and (ii) sets forth associations that provide configuration information that aid in determining a specific back end data source from which the various point data and the various non point data is to be acquired; and
insuring that the tag list comprises up-to-date information by configuring the tag list acquisition process and a non-point data acquisition process as periodic events executed at pre-designated times or pre-designated time intervals.

2. The method of claim 1 wherein, the at least one back-end resource is derived from an industrial process.

3. The method of claim 2 wherein, the industrial process comprises a continuous process.

4. The method of claim 2 wherein, the industrial process includes operations of facilities involved in at least one of: chemical refining, chemical synthesis, water treatment, water management, manufacturing, assembly, natural resource procurement, natural resource refinement, power generation, power transmission, food processing, beverage processing, raw materials processing, agricultural processing, materials processing, petrochemical refining, oil refining, and gas refining.

5. The method of claim 4 wherein, the natural resource includes at least one of: oil, petrochemical, and natural gas.

6. The method of claim 1 wherein, assessing the current configuration of the first data structure comprises comparing the first data structure's desired and current configurations to determine differences between the first data structure's desired and current configurations, and wherein assessing the current configuration of the second data structure comprises comparing the second data structure's desired and current configurations to determine differences between the second data structure's desired and current configurations.

7. The method of claim 6 wherein, the differences between the first data structure's desired and current configurations comprise addition, deletion, and modification transformations applicable to the first data structure's current configurations to achieve the first data structure's desired configurations, and wherein the differences between the second data structure's desired and current configurations comprise addition, deletion, and modification transformations applicable to the second data structure's current configurations to achieve the second data structure's desired configuration.

8. The method of claim 1 wherein, changes in point data and non-point data content for the first and second data structures are propagated by modifying the first and second data structure's desired configurations whereupon a synchronization process conforms the content of the first and second data structures to the desired configurations.

9. The method of claim 1 wherein, a synchronization process detects content changes to the first and second data structures and automatically conforms the stored point data and non-point data to the content changes.

10. The method of claim 1 wherein, the performing a synchronization process at designated times or designated time intervals to automatically detect and process changes to the first and second data structures comprises:
performing a synchronization process at designated time intervals to automatically detect and process changes to the first and second data structures.

11. The method of claim 1 wherein the second acquisition frequency different from the first acquisition frequency is configured on the basis of dynamic change expected in the point data per unit time.

12. The method of claim 1 wherein the point data acquired from the at least one back-end resource at the second acquisition frequency different from the first acquisition frequency comprises:
point data that is refreshed at a desired frequency.

13. The method of claim 1 wherein the point data acquired from the at least one back-end resource at the second acquisition frequency different from the first acquisition frequency comprises:
periodically acquired data reflecting a motor's operating speed.

14. The method of claim 1 wherein the point data acquired from the at least one back-end resource at the second acquisition frequency different from the first acquisition frequency comprises:
periodically acquired data reflecting a motor's operating temperature.

15. The method of claim 1 wherein the performing a synchronization process at designated times or designated time intervals to automatically detect and process changes to the first and second data structures comprises:
after the assessing the current configuration of the first data structure and providing modifications to achieve a desired configuration for the first data structure, performing a synchronization process at designated times or designated time intervals to automatically detect and process changes to the first data structure; and after assessing the current configuration of the second data structure and providing modifications to achieve a desired configuration for the second data structure, performing a synchronization process at designated times or designated time intervals to automatically detect and process changes to the second data structure.

16. The method of claim 1 wherein the using configuration rules to identify a record to be removed from the current configuration of the first data structure to reflect a change desired as a result of removal of an instrument from an operational environment comprises:

using configuration rules to identify a record to be removed from the current configuration of the first data structure to reflect a change desired as a result of removal of an instrument that is not in the first data structure and not in the second data structure.

17. The method of claim 1 wherein the using configuration rules to identify a record to be removed from the current configuration of the first data structure to reflect a change desired as a result of removal of an instrument from an operational environment comprises:

use configuration rules to identify a record to be removed from the current configuration of the first data structure to reflect a change desired as a result of replacement of an instrument that is not in the first data structure and not in the second data structure.

18. The method of claim 1 wherein the using configuration rules to identify a record to be removed from the current configuration of the first data structure to reflect a change desired as a result of removal of an instrument from an operational environment comprises:

using configuration rules to identify a record to be removed from the current configuration of the first data structure to reflect a change desired as a result of removal of an instrument that comprises a motor or a gauge.

19. A non-transitory computer-readable storage medium having stored thereon instructions executable by a processor to cause the processor to:

store non-point data, which includes data contextualizing point data, in a first data structure with a current configuration, wherein the non-point data is acquired, for storage in the first data structure, from at least one back-end resource at a first acquisition frequency;

store the point data in a second data structure with a current configuration, wherein the point data is acquired, for storage in the second data structure, from the at least one back-end resource at a second acquisition frequency defined by the current configuration of the first data structure, the second acquisition frequency being different from the first acquisition frequency;

assess the current configuration of the first data structure and provide modifications to achieve a desired configuration for the first data structure;

assess the current configuration of the second data structure and provide modifications to achieve a desired configuration for the second data structure;

modify the first and second acquisition frequencies, as necessary, to store the point data and non-point data within the first and second data structures according to the desired configurations; and perform a synchronization process at designated times or designated time intervals to automatically detect and process changes to the first and second data structures;

wherein the perform a synchronization process at designated times or designated time intervals to automatically detect and process changes to the first and second data structures comprises:

use configuration rules to identify a record to be removed from the current configuration of the first data structure to reflect a change desired as a result of removal of an instrument from an operational environment develop a tag list by a tag list acquisition process that (i) sets forth logical groupings or combinations defining how various point data and various non point data will be associated and (ii) sets forth associations that provide configuration information that aid in determining a specific back end data source from which the various point data and the various non point data is to be acquired; and insure that the tag list comprises up-to-date information by configuring the tag list acquisition process and a non-point data acquisition process as periodic events executed at pre-designated times or pre-designated time intervals.

20. The computer-readable storage medium of claim 19 wherein the second acquisition frequency different from the first acquisition frequency is configured on the basis of dynamic change expected in the point data per unit time.

21. The computer-readable storage medium of claim 19 wherein the point data acquired from the at least one back-end resource at the second acquisition frequency different from the first acquisition frequency comprises:

point data that is refreshed at a desired frequency.

22. The computer-readable storage medium of claim 19 wherein the point data acquired from the at least one back-end resource at the second acquisition frequency different from the first acquisition frequency comprises:

periodically acquired data reflecting a motor's operating speed.

23. The computer-readable storage medium of claim 19 wherein the point data acquired from the at least one back-end resource at the second acquisition frequency different from the first acquisition frequency comprises:

periodically acquired data reflecting a motor's operating temperature.

24. The computer-readable storage medium of claim 19 wherein the instructions executable by a processor to cause the processor to perform a synchronization process at designated times or designated time intervals to automatically detect and process changes to the first and second data structures comprises:

instructions executable by a processor to cause the processor to:

after the assessment of the current configuration of the first data structure and provision of modifications to achieve a desired configuration for the first data structure, perform a synchronization process at designated times or designated time intervals to automatically detect and process changes to the first data structure; and after the assessment of the current configuration of the second data structure and provision of modifications to achieve a desired configuration for the second data structure, perform a synchronization process at designated times or designated time intervals to automatically detect and process changes to the second data structure.

25. The computer-readable storage medium of claim 19 wherein the use configuration rules to identify a record to be removed from the current configuration of the first data structure to reflect a change desired as a result of removal of an instrument from an operational environment comprises:
use configuration rules to identify a record to be removed from the current configuration of the first data structure to reflect a change desired as a result of removal of an instrument that is not in the first data structure and not in the second data structure.

26. The computer-readable storage medium of claim 19 wherein the use configuration rules to identify a record to be removed from the current configuration of the first data structure to reflect a change desired as a result of removal of an instrument from an operational environment comprises:
use configuration rules to identify a record to be removed from the current configuration of the first data structure to reflect a change desired as a result of replacement of an instrument that is not in the first data structure and not in the second data structure.

27. The computer-readable storage medium of claim 19 wherein the use configuration rules to identify a record to be removed from the current configuration of the first data structure to reflect a change desired as a result of removal of an instrument from an operational environment comprises:
use configuration rules to identify a record to be removed from the current configuration of the first data structure to reflect a change desired as a result of removal of an instrument that comprises a motor or a gauge.

28. Apparatus comprising:
a processor; and
a memory;
the processor to:
store non-point data, which includes data contextualizing point data, in a first data structure with a current configuration, wherein the non-point data is acquired, for storage in the first data structure, from at least one back-end resource at a first acquisition frequency;
store the point data in a second data structure with a current configuration, wherein the point data is acquired, for storage in the second data structure, from the at least one back-end resource at a second acquisition frequency defined by the current configuration of the first data structure, the second acquisition frequency being different from the first acquisition frequency;
assess the current configuration of the first data structure and provide modifications to achieve a desired configuration for the first data structure;
assess the current configuration of the second data structure and provide modifications to achieve a desired configuration for the second data structure;
modify the first and second acquisition frequencies, as necessary, to store the point data and non-point data within the first and second data structures according to the desired configurations; and
perform a synchronization process at designated times or designated time intervals to automatically detect and process changes to the first and second data structures;
wherein the perform a synchronization process at designated times or designated time intervals to automatically detect and process changes to the first and second data structures comprises:
use configuration rules to identify a record to be removed from the current configuration of the first data structure to reflect a change desired as a result of removal of an instrument from an operational environment develop a tag list by a tag list acquisition process that (i) sets forth logical groupings or combinations defining how various point data and various non point data will be associated and (ii) sets forth associations that provide configuration information that aid in determining a specific back end data source from which the various point data and the various non point data is to be acquired; and
insure that the tag list comprises up-to-date information by configuring the tag list acquisition process and a non-point data acquisition process as periodic events executed at pre-designated times or pre-designated time intervals.

29. The apparatus of claim 28 wherein the second acquisition frequency different from the first acquisition frequency is configured on the basis of dynamic change expected in the point data per unit time.

30. The apparatus of claim 28 wherein the point data acquired from the at least one back-end resource at the second acquisition frequency different from the first acquisition frequency comprises:
point data that is refreshed at a desired frequency.

31. The apparatus of claim 28 wherein the point data acquired from the at least one back-end resource at the second acquisition frequency different from the first acquisition frequency comprises:
periodically acquired data reflecting a motor's operating speed.

32. The apparatus of claim 28 wherein the point data acquired from the at least one back-end resource at the second acquisition frequency different from the first acquisition frequency comprises:
periodically acquired data reflecting a motor's operating temperature.

33. The apparatus of claim 28 wherein the perform a synchronization process at designated times or designated time intervals to automatically detect and process changes to the first and second data structures comprises:
after the assess the current configuration of the first data structure and providing modifications to achieve a desired configuration for the first data structure, perform a synchronization process at designated times or designated time intervals to automatically detect and process changes to the first data structure; and
after the assess the current configuration of the second data structure and providing modifications to achieve a desired configuration for the second data structure, perform a synchronization process at designated times or designated time intervals to automatically detect and process changes to the second data structure.

34. The apparatus of claim 28 wherein the use configuration rules to identify a record to be removed from the current configuration of the first data structure to reflect a change desired as a result of removal of an instrument from an operational environment comprises:
use configuration rules to identify a record to be removed from the current configuration of the first data structure to reflect a change desired as a result of removal of an instrument that is not in the first data structure and not in the second data structure.

35. The apparatus of claim 28 wherein the use configuration rules to identify a record to be removed from the current configuration of the first data structure to reflect a change desired as a result of removal of an instrument from an operational environment comprises:
use configuration rules to identify a record to be removed from the current configuration of the first data structure to reflect a change desired as a result of replacement of an instrument that is not in the first data structure and not in the second data structure.

36. The apparatus of claim 28 wherein the use configuration rules to identify a record to be removed from the current configuration of the first data structure to reflect a change desired as a result of removal of an instrument from an operational environment comprises:

use configuration rules to identify a record to be removed from the current configuration of the first data structure to reflect a change desired as a result of removal of an instrument that comprises a motor or a gauge.

* * * * *